(12) United States Patent
Taniyama et al.

(10) Patent No.: US 7,748,731 B2
(45) Date of Patent: Jul. 6, 2010

(54) AIRBAG DEVICE

(75) Inventors: Hiroyuki Taniyama, Osaka (JP); Naoki Yamaji, Osaka (JP); Seiichiro Kamura, Osaka (JP); Hidetaka Azuma, Kyoto (JP); Kou Sasaki, Osaka (JP)

(73) Assignee: Ashimori Industry Co., Ltd., Osaka (JP)

( * ) Notice: Subject to any disclaimer, the term of this patent is extended or adjusted under 35 U.S.C. 154(b) by 0 days.

(21) Appl. No.: 12/259,848

(22) Filed: Oct. 28, 2008

(65) Prior Publication Data

US 2009/0051147 A1    Feb. 26, 2009

Related U.S. Application Data

(63) Continuation of application No. 10/587,021, filed as application No. PCT/JP2005/000900 on Jan. 25, 2005, now Pat. No. 7,490,849.

(30) Foreign Application Priority Data

| Jan. 30, 2004 | (JP) | 2004-022943 |
| Jan. 30, 2004 | (JP) | 2004-022944 |
| Jan. 30, 2004 | (JP) | 2004-022945 |
| Jan. 30, 2004 | (JP) | 2004-022946 |

(51) Int. Cl.
*B60R 21/203* (2006.01)

(52) U.S. Cl. .................. 280/728.2; 280/728.3; 280/731

(58) Field of Classification Search .............. 280/728.2, 280/728.3, 731
See application file for complete search history.

(56) References Cited

U.S. PATENT DOCUMENTS

| 4,828,286 A | 5/1989 | Fohl |
| 5,647,610 A | 7/1997 | Nagata |
| 5,730,460 A | 3/1998 | Niederman |
| 5,775,721 A * | 7/1998 | Grout .................. 280/727 |
| 5,931,497 A | 8/1999 | Fischer |

(Continued)

FOREIGN PATENT DOCUMENTS

CN    1167704 A    5/1997

(Continued)

OTHER PUBLICATIONS

Lutter et al., Translation of DE 102 03 960, Jul. 2003.*

*Primary Examiner*—Ruth Ilan
*Assistant Examiner*—Karen Jane J Amores
(74) *Attorney, Agent, or Firm*—Sughrue Mion, PLLC

(57) ABSTRACT

In an airbag device, a decorative member is prevented from being scattered with a simple structure at the time of expansion of an airbag. That is, a concave part of the airbag cover (50) on which the decorative member is mounted is connected to an unmoved connection member while freely separable from other portions at the time of expansion of an airbag. To that end, there are formed, on the inner faces of the airbag cover (50), a circular tear line Lc for partitioning the concave part (52) and a plurality of tear lines L1~4 extending outward from the tear line Lc in the radial direction thereof for forming each of opening pieces (50a). Further, attachment pieces (50b) of respective opening pieces (50a) are fastened to plastic deformable attachment parts of a base plate by screws. With this structure, the concave part of the airbag cover can be immovably held at the time of spread of the airbag.

4 Claims, 24 Drawing Sheets

U.S. PATENT DOCUMENTS

| | | | |
|---|---|---|---|
| 6,042,147 A | | 3/2000 | Nishijima et al. |
| 6,328,332 B1 * | | 12/2001 | Schutz .................... 280/728.2 |
| 6,561,538 B2 | | 5/2003 | Ford et al. |
| 6,565,113 B2 | | 5/2003 | Kassman et al. |
| 6,695,344 B2 | | 2/2004 | Hauer |
| 7,131,661 B2 * | | 11/2006 | Webber et al. .......... 280/728.2 |
| 7,195,275 B2 | | 3/2007 | Abe |
| 7,246,820 B2 | | 7/2007 | Marotzke et al. |
| 7,490,849 B2 * | | 2/2009 | Taniyama et al. ........ 280/728.2 |
| 2001/0035632 A1 | | 11/2001 | Amamori et al. |
| 2002/0117838 A1 | | 8/2002 | Burdock |
| 2002/0163172 A1 | | 11/2002 | Mochizuki et al. |
| 2003/0042717 A1 * | | 3/2003 | Hauer ....................... 280/731 |
| 2003/0067148 A1 | | 4/2003 | Keutz |
| 2004/0007854 A1 | | 1/2004 | Webber et al. |
| 2004/0021303 A1 | | 2/2004 | Ford et al. |
| 2004/0256840 A1 * | | 12/2004 | Lutter et al. ............. 280/728.3 |
| 2005/0184486 A1 * | | 8/2005 | Schneider et al. ........ 280/728.2 |
| 2007/0126216 A1 * | | 6/2007 | Nakamura et al. .......... 280/731 |
| 2007/0290487 A1 * | | 12/2007 | Kreuzer ................... 280/728.3 |
| 2008/0265554 A1 * | | 10/2008 | Nakamura et al. ....... 280/743.1 |
| 2009/0091107 A1 * | | 4/2009 | Shimazaki et al. .......... 280/731 |

FOREIGN PATENT DOCUMENTS

| | | |
|---|---|---|
| DE | 197 49 914 A1 | 5/1999 |
| DE | 10036759 A1 | 2/2002 |
| DE | 10203960 C1 * | 7/2003 |
| EP | 0983914 A2 | 3/2000 |
| JP | 06-051023 U | 7/1994 |
| JP | 06-060560 U | 8/1994 |
| JP | 07-285408 A | 10/1995 |
| JP | 10-053084 A | 2/1998 |
| JP | 10-273007 A | 10/1998 |
| JP | 2000-043666 A | 2/2000 |
| JP | 2000-289552 A | 10/2000 |
| JP | 2001-030864 A | 2/2001 |
| JP | 2002-264753 A | 9/2002 |
| JP | 2002-362276 A | 12/2002 |
| JP | 2003-501308 A | 1/2003 |
| JP | 2004-507402 A | 3/2004 |
| WO | 98/14353 A1 | 4/1998 |
| WO | 02/18181 A1 | 3/2002 |
| WO | 03/062023 A1 | 7/2003 |

* cited by examiner

PRIOR ART

AIRBAG DEVICE

CROSS-REFERENCE TO RELATED APPLICATIONS

This is a Continuation Application of U.S. application Ser. No. 10/587,021 filed Jul. 24, 2006, which is a National Stage Application filed under §371 of PCT Application No. PCT/JP05/00900 filed Jan. 25, 2005. The entire disclosure of the prior application is hereby incorporated by reference.

TECHNICAL FIELD

The present invention relates to an airbag device for use in a driver seat.

BACKGROUND TECHNOLOGY

For an airbag device for use in a driver seat of a car, although conventionally there has been an airbag in which a decorative member is fixed to a portion extended from a steering shaft of a steering equipment, and the airbag is folded and housed around a center member, and the airbag is covered with an airbag cover, there was a problem in that since the decorative member provided with a multifunction such as, particularly, a horn function is heavy in weight, it is jumped out together with the airbag at the time of spread of the airbag, or a cover for holding the decorative member is scattered to strike against an occupant, and so forth.

Accordingly, there has been known an airbag device in which a cover is opened owing to the expansion of the airbag, causing them to be difficult in scattering, and at the same time, a decorative member is not jumped out together with the airbag toward an occupant side.

FIG. 25 shows an example of an airbag device as disclosed in the specification of German Patent No. 1974991C2. As illustrated, a decorative member 21R provided on the central portion of a steering wheel 24R is fitted in a guide sleeve 10R which is made of a non-elastic material attached to a steering shaft, and a diameter of an end part 22R of the guide sleeve 10R at the occupant side is formed smaller than that of the decorative member 21R, whereby when an airbag 1R is spread as illustrated, the decorative member 21R is held by the guide sleeve 10R not to move together with the expanded airbag 1R.

However, according to the conventional airbag device, since a large force is concentrated onto an attachment part of an airbag cover at the time of expansion of the airbag, the attachment part needs to be particularly reinforced, raising a problem of increasing costs.

Meanwhile, according to the conventional airbag device, it is necessary to provide not only the guide sleeve 10R made of non-elastic material separately, but also process the guide sleeve 10R so as to house and hold the decorative member 21R inside the guide sleeve 10R, raising a problem in that a manufacture thereof becomes complex and a manufacturing cost increases.

DISCLOSURE OF THE INVENTION

Problems To Be Solved By The Invention

The present invention has been generally developed to solve the problems of the prior art technique, and it is the first object of the present invention to realize an airbag device with a simple structure, wherein the airbag device is capable of preventing a decorative member from being scattered together with an airbag toward an occupant side caused by the scattering of an airbag cover provided with the decorative member and so forth at the time of spread of the airbag, thereby reducing a manufacturing cost to a large extent compared with that of a conventional structure.

To be concrete, the airbag cover can be divided and opened with ease at the time of expansion of the airbag while leaving the central portion of the airbag cover provided with a decorative member and so forth, thereby dispensing with reinforcement of attachment parts of the airbag cover as made conventionally, and reducing injury to be applied to an occupant at the time of spread (at the time of expansion) of the airbag.

The second object is to cause the airbag cover to be divided and opened with ease at the time of expansion of the airbag while leaving the central portion of the airbag cover provided with the decorative member and so forth.

The third object is to prevent gas leakage with a simple structure at the time of expansion of the airbag.

MEANS FOR SOLVING PROBLEM

The invention disclosed in Claims 1 is an airbag device comprising an inflator for generating gas, an airbag being expandable by gas generated in the inflator, an airbag cover for covering the airbag, and a base plate for fixing the airbag and the airbag cover thereto, wherein the airbag cover is openable outward at the time of expansion of the airbag caused by gas from the inflator, wherein the airbag cover has a plurality of open pieces for forming openings by tear lines and so forth at the time of expansion of the airbag, and the open pieces are fixed to a plurality of plastic deformable attachment parts which are provided on the base plate and the open pieces are completely separated and opened outward owing to the expansion of the airbag.

The invention disclosed in Claim 2 is the airbag device disclosed in Claim 1, wherein the airbag cover has a fixed part fixed directly or indirectly to the base plate substantially at a central portion thereof.

The invention disclosed in Claim 3 is the airbag device disclosed in Claim 1 or 2, wherein the airbag cover has tear lines at the inner face thereof for opening each of the open pieces outward while leaving the fixed part, and the tear lines comprise a tear line having substantially a circular shape for partitioning the fixed part and each of the open pieces, and a plurality of tear lines extending outward from the tear line having the circular shape in the radial direction thereof.

The invention disclosed in Claim 4 is the airbag device disclosed in any of Claims 1 to 3, wherein the fixed part of the airbag cover is provided with a decorative member and so forth.

The invention disclosed in Claim 5 is the airbag device disclosed in any of Claims 1 to 4, wherein attachment parts are disposed along the peripheral edge of the base plate.

The invention disclosed in Claims 6 is an airbag device comprising an inflator for generating gas, an airbag being expandable by gas generated in the inflator, an airbag cover for folding the airbag to house the folded airbag therein and openable at the time of expansion of the airbag, a base plate having an opening at a central portion in which the inflator is fitted, and a cushion plate for clamping and holding the airbag between itself and the base plate, wherein the cushion plate has concave parts on its front face for housing a clamping and holding part of a connection member, and a central portion of the airbag cover being opened by tear lines and so forth at the time of expansion of the airbag is connected to the connection member which is clamped and held by the base plate and the cushion plate together with the airbag, and the connection member holds the central portion of the airbag cover at the time of spread of the airbag bag when the airbag is expanded forward by gas from the inflator while getting across the central portion of the airbag cover.

The invention disclosed in Claim 7 is the airbag device disclosed in Claim 6, wherein the connection member has holes or recesses, and the concave parts of the cushion plate have protrusions capable of engaging with the holes or the recesses.

The invention disclosed in Claim 8 is the airbag device disclosed in Claim 6, wherein the connection member is fastened and fixed to the concave parts of the cushion plate together by a bolt for fixing the inflator.

The invention disclosed in Claim 9 is the airbag device disclosed in any of Claims 6 to 8, wherein the connection part is made of a metal member.

The invention disclosed in Claims 10 is an airbag device comprising an inflator for generating gas, an airbag being expandable by gas generated in the inflator, an airbag cover for covering the airbag, and a base plate for fixing the airbag and the airbag cover, wherein the airbag cover is openable outward at the time of expansion of the airbag caused by gas from the inflator, wherein the airbag cover has a fixed part fixed directly or indirectly to the base plate substantially at a central portion thereof, and a plurality of open pieces formed around the fixed part, and the airbag has a cylindrical part which is restrained from being come out by the fixed part at the time of expansion of the airbag so as to be expandable forward across the fixed part, and the fixed part of the airbag cover has a concave part for guiding the airbag at the time of spread of the airbag.

The invention disclosed in Claim 11 is the airbag device disclosed in Claim 10, wherein a group of tear lines for partitioning a plurality of open pieces formed at and around the fixed part are provided on the inner face of the airbag cover, and the open pieces are openable outward by the tear lines at the time of spread of the airbag.

The invention disclosed in Claim 12 is the airbag device disclosed in Claim 11, wherein the tear lines are formed as grooves provided on the inner face of the airbag cover, and the tear line formed around the fixed part has parts which are cut beforehand.

The invention disclosed in Claim 13 is the airbag device disclosed in any of Claims 10 to 12, wherein a plurality of open pieces of the airbag cover are openable outward around the fixed part, and separated from one another after the spread of the airbag.

The invention disclosed in Claim 14 is the airbag device disclosed in any of Claims 10 to 13, wherein a decorative member or a horn equipment is housed in the concave part.

The invention disclosed in Claim 15 is the airbag device disclosed in Claim 14, wherein the decorative member covers the cut parts of the tear lines formed around the concave parts of the airbag cover not to be visible from outside.

The invention disclosed in Claims 16 is an airbag device comprising an inflator for generating gas, an airbag being expandable by gas generated in the inflator, an airbag cover for covering the airbag, and a fixed plate for fixing the airbag cover, wherein the airbag has an opening hole part formed on a part thereof by aligning at least two pieces of base cloths with each other, each piece of base cloth having at least hole parts displaced in position, while the airbag cover has a concave part fixed directly or indirectly to the base plate substantially at a central portion thereof, and the concave part guide respective hole parts of the opening hole part, causing the airbag to be expanded.

The invention disclosed in Claim 17 is the airbag device disclosed in Claim 16, wherein the concave part is separated by the tear lines formed around or inside the concave part at the time of spread of the airbag.

The invention disclosed in Claim 18 is the airbag device disclosed in Claim 16, wherein the concave part is connected to the airbag cover by at least one linking part which is separable with ease.

The invention disclosed in Claim 19 is the airbag device disclosed in any of Claims 16 to 18, wherein the airbag cover has a rib for causing the holes of a closable part to be held in a state to be always aligned with each other when the airbag is housed in the airbag cover.

The invention disclosed in Claim 20 is the airbag device disclosed in Claim 19, wherein the rib is disposed by plural number, the ribs have substantially the same shape as the concave parts and are disposed circumferentially.

The invention disclosed in Claim 21 is the airbag device disclosed in any of Claims 16 to 20, wherein a decorative member or a horn equipment is housed in the concave part.

Effect Of The Invention (1) Since the open pieces are separated from the fixed part and other open pieces owing to the spread of the airbag and opened outwardly, the open pieces do not impede the expansion and spread of the airbag, so that the airbag is spreadable smoothly and reliably.

(2) Since the attachment parts are deformed to absorb a force, reinforcement of the attachment parts of the airbag cover is not needed.

(3) Even if an occupant contacts the airbag cover, a spread force (expansion force) of the airbag is dispersed when each open piece is opened, injury to be applied to the passenger can be reduced.

Further, by reducing sizes of the open pieces, each open piece is liable to be opened even if the occupant contacts the airbag, injury to be applied to the passenger can be reduced.

(4) Since a plurality of tear lines are provided on the inner face of the airbag cover for covering the airbag, the airbag cover can be split with ease along the tear line at the time of expansion of the airbag. Further, at the same time, since the tear line is structured by the circular tear line at the central portion and a plurality of tear lines extended radially from the circular tear line, it is possible to cause the central portion to which the decorative member and so forth of the airbag cover are attached to be substantially an immovable fixed part at the time of expansion of the airbag, so that the decorative member and so forth can be completely prevented from being jumped out together with the airbag toward the occupant side at the time of spread of the airbag. Still further, if there are provided cutting portions on the tear lines in advance, the opening of the airbag cover can be reliably implemented at the time of expansion of the airbag, and also the appearance of the airbag device is not impaired because the cutting portions of the tear lines are covered with the decorative member not to be visible from outside.

(5) Since each open piece of the airbag cover is attached to the plastic deformable attachment piece at the time of spread of the airbag on the base plate, a force intended to be returned to an original state caused by the spring-back of the attachment piece once deformed at the time of spread of the airbag does not act, so that the airbag can be smoothly and reliably spread.

(6) Since the connection member for immovably fixing the decorative member mounting part at the central portion of the airbag cover is clamped and fixed like the airbag utilizing the base plate and the cushion plate for clamping and fixing the inflator, the attachment parts can be subjected to sharing, thereby firmly attaching the connection member to the base plate without requiring special means.

Accordingly, it is possible to prevent the decorative member and so forth from being jumped out together with the airbag toward the occupant side at the time of spread of the airbag with a simple structure, and since the structure is simplified, the airbag device can be manufactured with a low cost.

(7) Leakage of gas at the time of expansion of the airbag can be prevented with a simple structure.

BRIEF DESCRIPTION OF DRAWINGS

FIG. 5 shows a cushion plate according to a first embodiment, wherein FIG. 6 shows a cushion plate according to a second embodiment, wherein FIG. 11 shows an airbag according to a fourth embodiment, wherein FIG. 13 shows an airbag cover according to the first embodiment, wherein

EXPLANATION OF REFERENCE NUMERALS

10 . . . steering wheel 16 . . . base plate, 18 . . . inflator, 20 . . . support member, 22, 22' . . . cushion plate, 28, 28' . . . connection member, 30 . . . center member, 32 . . . center body part, 40 . . . airbag, 46 . . . cylindrical part, 50 . . . airbag cover, 52 . . . concave part.

BEST MODE FOR CARRYING OUT THE INVENTION

An airbag device for use in a driver seat according to embodiments of the present invention is now described with reference to attached drawings.

Figure 1:
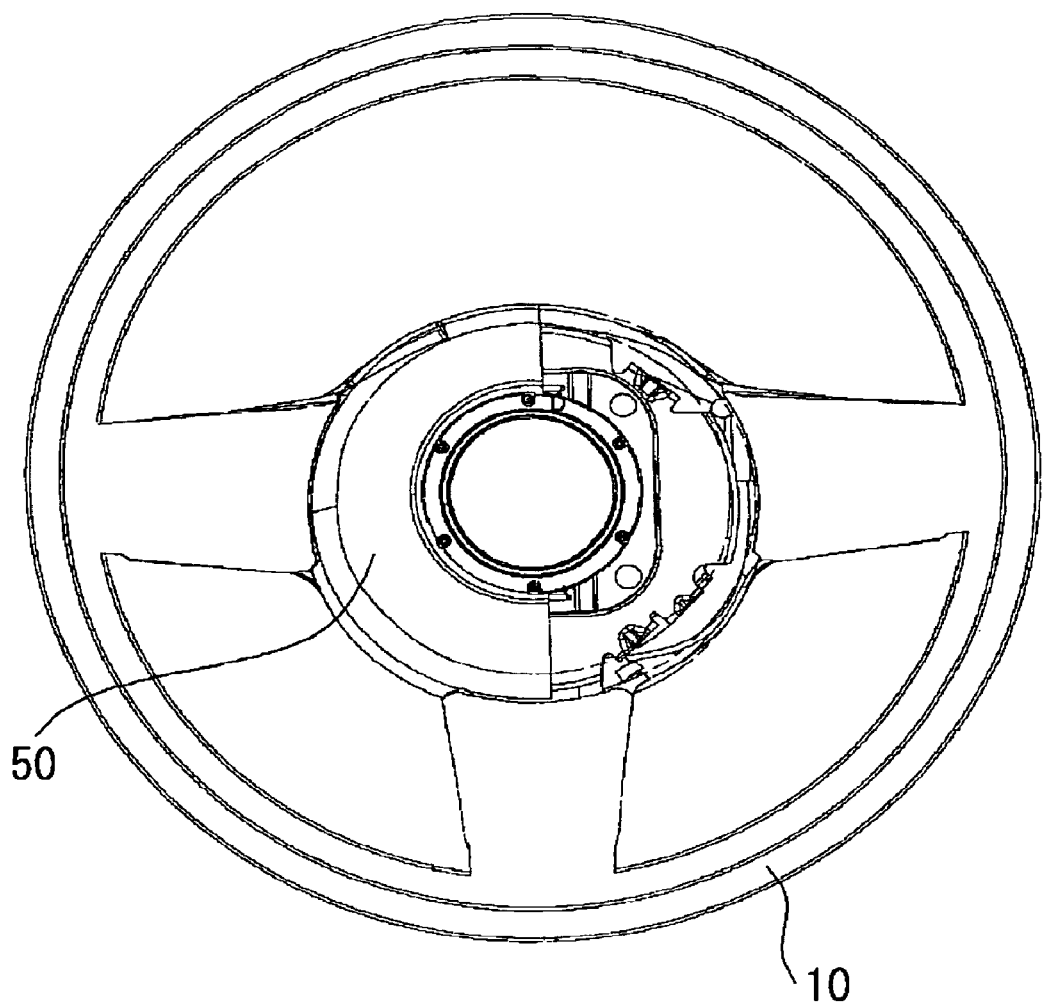
FIG. 1 is a front view showing an airbag device of the present invention.
Figure 2:
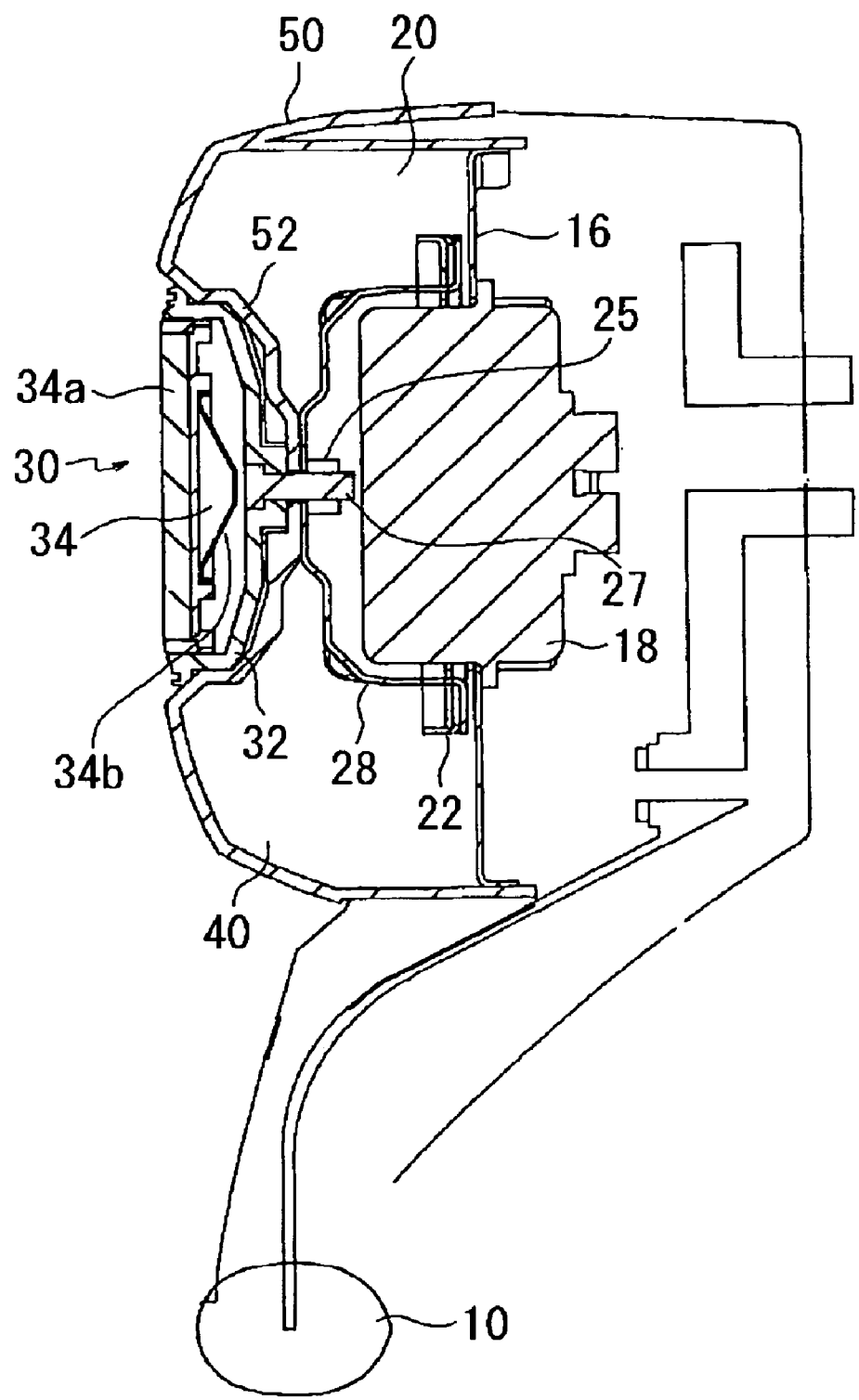
FIG. 2 is a sectional view showing a main part of the airbag device of the present invention.

FIG. 1 is a front view showing a mounting state of an airbag device, and FIG. 2 is a side view of the airbag a main part of which is ruptured.

The airbag device of the present invention is to be built in a steering equipment of a vehicle, as shown in FIG. 1 and FIG. 2, and is provided with a support member 20, a center member 30, an airbag 40 and an airbag cover 50.

The support member 20 is a member which is attached to an end side of a steering shaft (not shown) and disposed substantially at a central portion of a steering wheel 10, and it is provided with a base plate 16, a cushion plate 22 and a connection member 28 according to the present embodiment.

Figure 3:
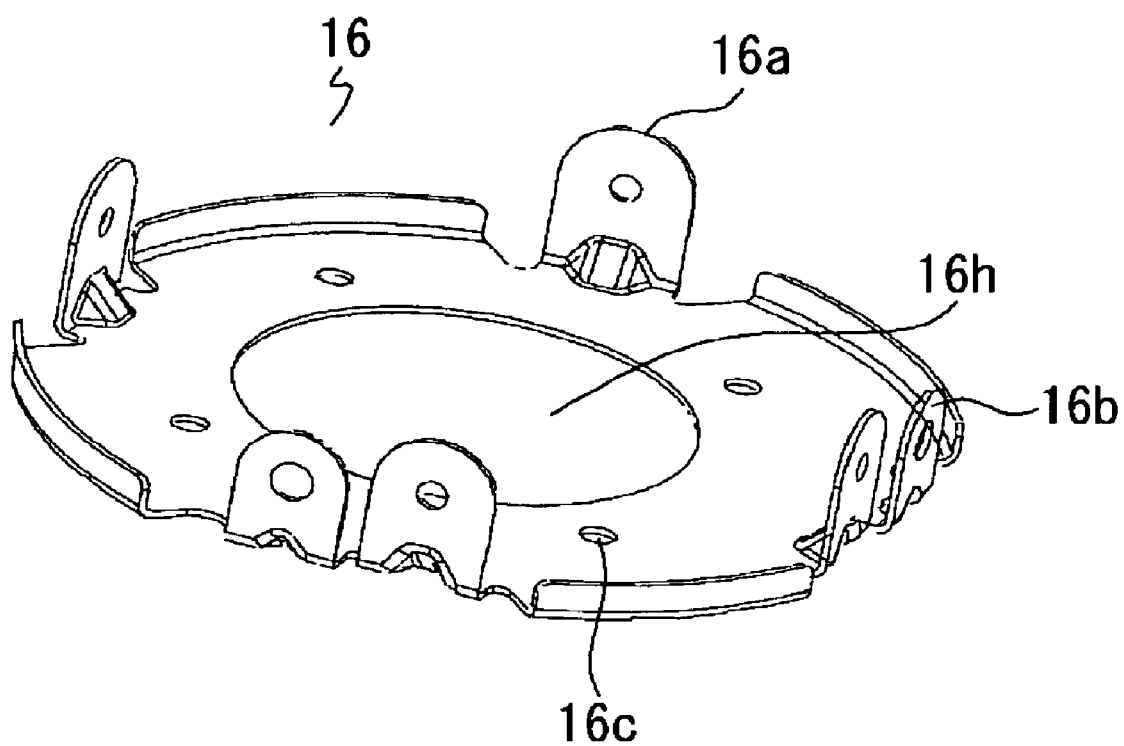
FIG. 3 is a perspective view of a rear face of a base plate.

FIG. 3 is a perspective view showing a rear face of the base plate 16.

The base plate 16 is formed substantially in a discoid shape, and has a hole part 16h formed at the central portion in which the inflator 18 is fittable, and attachment pieces 16a for attaching the airbag cover and attachment pieces 16b for attaching the base plate 16 itself are formed respectively at the rear face side thereof by cutting and raising the discoid face thereof. Meanwhile, it is defined in the present specification, as a matter of convenience, that a driver seat side is a front side, and an opposite side thereof is a back side.

Figure 4A:
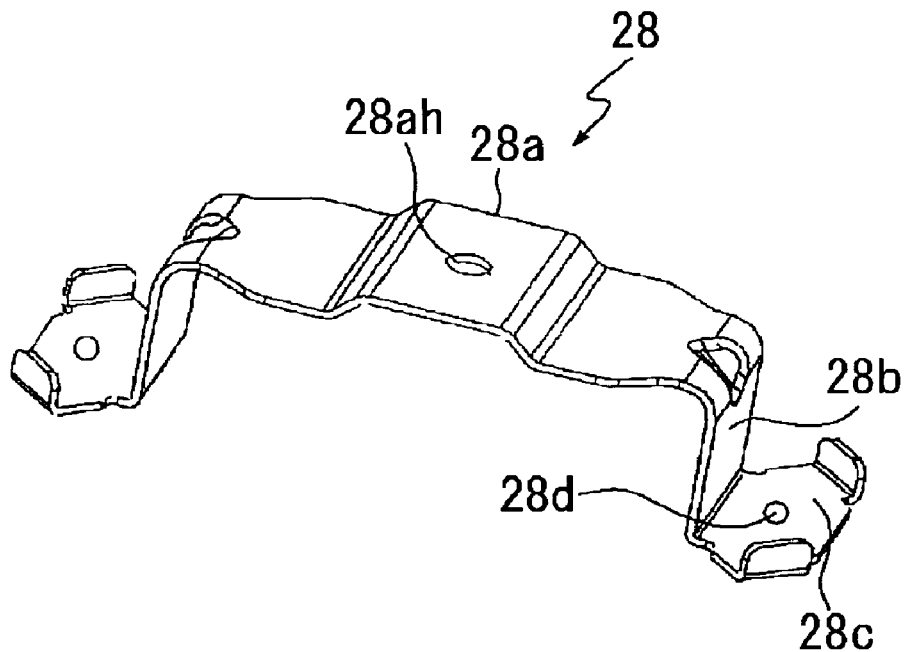
FIG. 4 is a perspective view of a connection member.
Figure 4B:
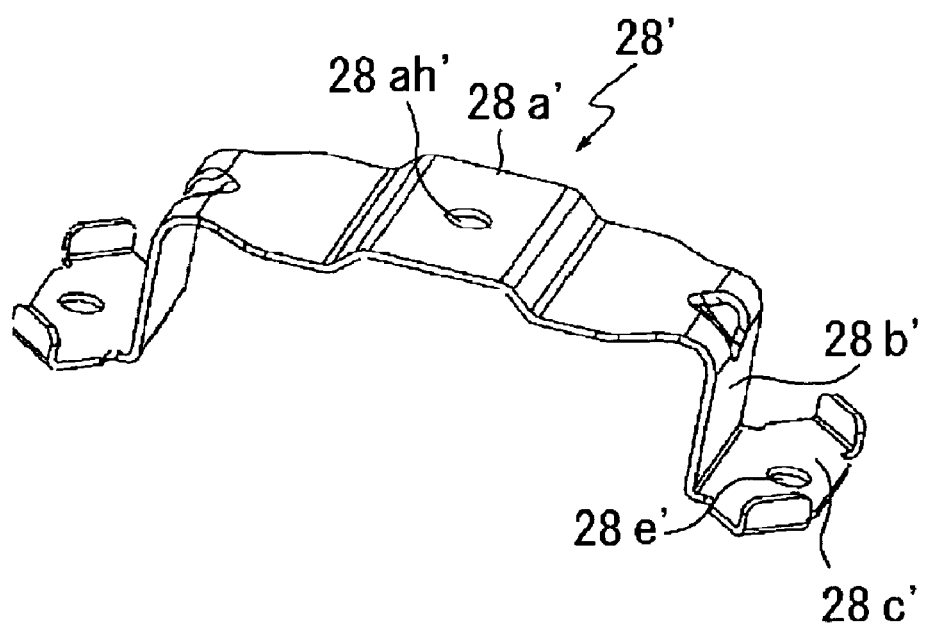

FIG. 4 is a perspective view of the connection member 28 shown in FIG. 2, wherein FIG. 4A shows a first embodiment and FIG. 4B shows a second embodiment.

The connection member 28 or 28' is made up of a sheet-like metal piece, as shown in FIG. 4A, FIG. 4B, and comprises a central part 28a or 28a' having a hole 28ah or 28ah' through which an attachment bolt 27 is fitted, leg parts 28b or 28b' which are formed by being bent substantially perpendicularly to the central part 28a or 28a' and at both sides thereof, and attachment feet 28c or 28c' formed by being bent substantially perpendicularly to the leg parts 28b or 28b'. On the attachment feet 28c of the first embodiment, there are formed holes or recesses 28d, for implementing positioning when combined with a cushion plate 22, described later. Further, on the attachment feet 28c' of the second embodiment, there are formed attachment holes 28e' corresponding to attachment holes 22a' of the cushion plate 22' and attachment holes 16c of the base plate 16, respectively described later, and these holes are fastened together by bolts, not shown.

Figure 5A:
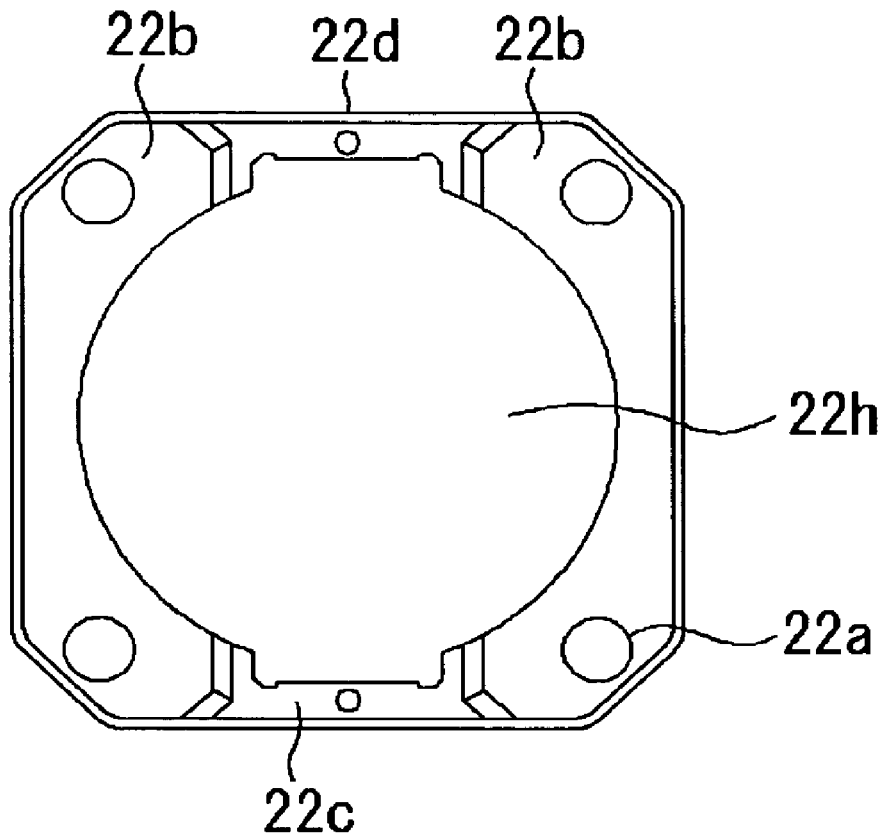
FIG. 5A is a rear view thereof.
Figure 5B:
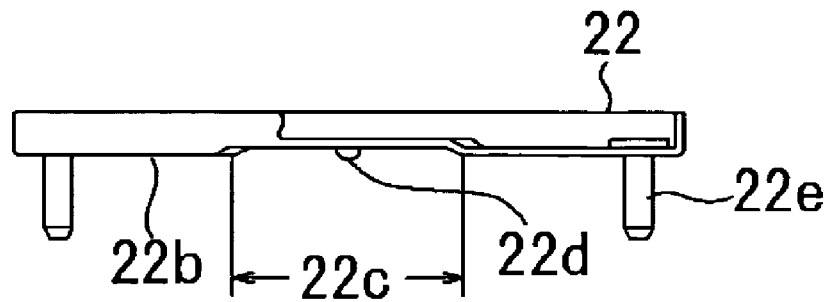
FIG. 5B is a side view thereof.
Figure 6A:
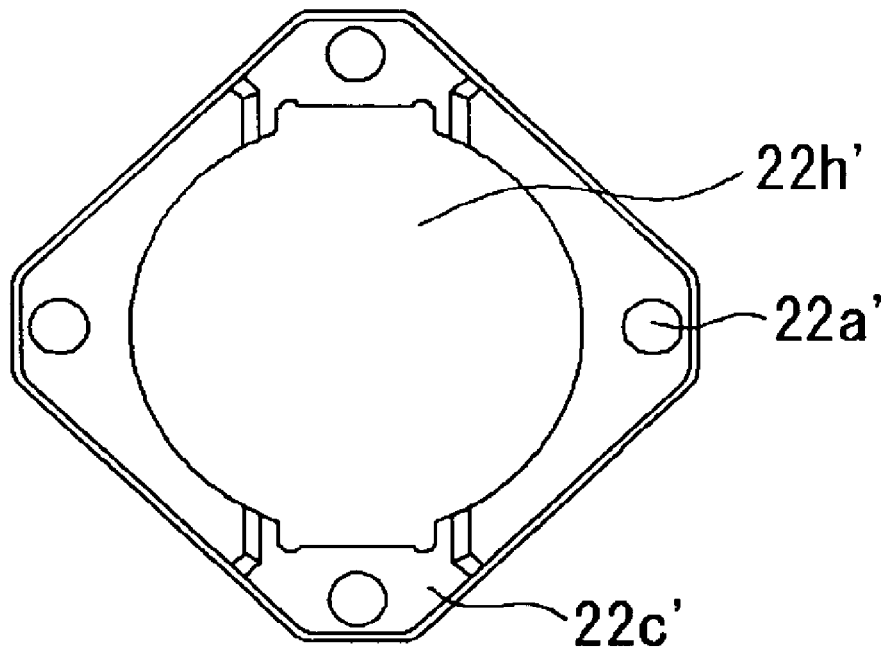
FIG. 6A is a rear view thereof.
Figure 6B:
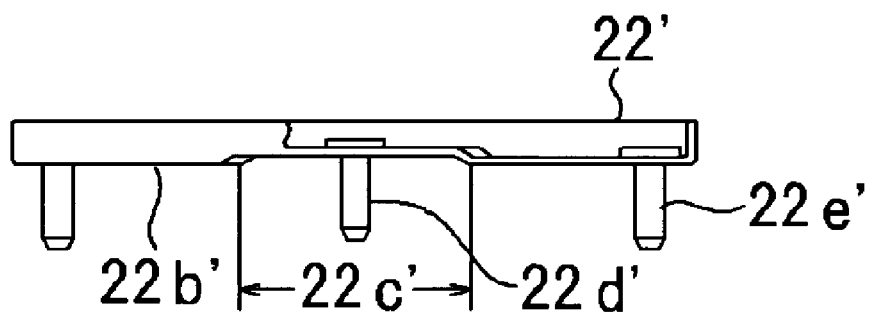
FIG. 6B is a side view thereof.

FIG. 5 shows a cushion plate according to the first embodiment, wherein FIG. 5A is a rear view thereof and FIG. 5B is a side view showing a part thereof in cross section, and FIG. 6 shows a cushion plate according to the second embodiment, wherein FIG. 6A is a rear view of the cushion plate of the second embodiment, and FIG. 6B is a side view showing a part thereof in cross section.

The cushion plate 22 of the first embodiment is substantially rectangular as shown in FIG. 5A which is the rear view thereof, and there are provided, at the central portion thereof, an insertion hole 22h through which the inflator 18 is inserted, and there are provided, at each corner around the insertion hole 22h, attachment holes 22a through which screws or rivets 22e and so forth are inserted for attaching the cushion plate 22 to the base plate 16.

The cushion plate 22 has butting faces 22b at its rear face which are capable of being butted against the front face side of the base plate 16, via the airbag 40, and there are formed, on the butting face 22b, concave parts 22c which are formed, for example, by a squeezing process, as evident from FIG. 5B which is the side view of the cushion plate 22. The concave parts 22c are formed to have a depth which is substantially the same thickness of the attachment feet 28c of the connection member 28 when the cushion plate 22 is connected to the base plate 16. Further, there are formed, on the concave parts 22c, convex parts 22d which correspond to the holes or recesses 28d formed on the attachment feet 28c and are engageable therewith.

With the configuration set forth above, when the base plate 16 is connected to the cushion plate 22, the airbag 40 can be clamped, held and fixed between the front face of the base plate 16 and the butting faces 22b of the cushion plate, and also the attachment feet 28c of the connection member 28 can be clamped, held and fixed between the front face side of the base plate 16 and the concave parts 22c of the cushion plate 22.

However, according to the cushion plate 22 of the first embodiment, positioning of the connection member 28 can be implemented with ease by the engagement between the convex parts 22d and the holes or recesses 28d of the connection member 28 when the connection member 28 is clamped and held between the base plate 16 and the cushion plate 22.

FIGS. 6A, 6B show the cushion plate 22' of the second embodiment. In the same figures, the portions which are the same as or correspond to those of FIGS. 5A, 5B are depicted by ['] on the same reference numerals. The cushion plates of the second and first embodiments are different from each other in that the attachment holes 22a are disposed outside the concave parts 22c according to the first embodiment while the attachment holes 22a' are disposed inside the concave parts 22' according to the second embodiment, but the other portions of the cushion plates of the second and first embodiments conform to each other. In the case of using the cushion plate 22' of the second embodiment, the connection member 28' of the second embodiment is used at the same time, and when connecting between the base plate 16 and the cushion plate 22', the airbag 40 is clamped and held between the front face of the base plate 16 and the butting faces 22b' of the cushion plate, while the attachment feet 28c' of the connection member 28' are clamped and held between the front face side of the base plate 16 and concave parts 22c' of the cushion plates 22', and further screws are inserted in the attachment holes 22a' of the cushion plates 22', the attachment holes 28e' of the connection member 28' and the attachment holes 16c of the base plate 16, thereby fastening them together.

An inflator 18 is formed substantially in a thick discoid shape, and is structured to be able to jet gas when detecting a predetermined shock. The inflator 18 penetrates the hole part 16h of the base plate 16 and is brought into intimate contact with the rear face side of the base plate 16, and fixed to the base plate 16 together with the cushion plate 22 or 22' by attachment bolts via the attachment holes 16c of the base plate 16. That is, the inflator 18 is fixed to the base plate 16 in a state to be protruded from and disposed on the front face of the base plate 16, and gas from the inflator 18 is to be jetted at the front side of the base plate 16.

According to the present embodiment, as shown in FIG. 2, the center member 30 is provided with a center body part 32 and a horn switch mechanism part 34 attached to the center body part 32. The center member 30 may have, for example, a decorative shape such as an emblem shape of a car, and so forth instead of or in addition to the horn switch mechanism part 34.

Figure 7:
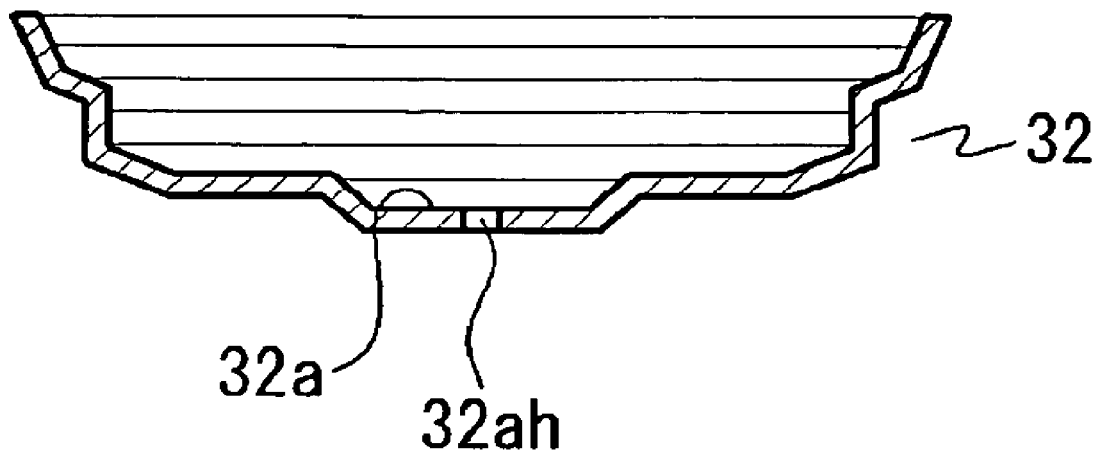
FIG. 7 is a sectional view of a center member body.

The center body part 32 is formed substantially in a bowl shape, as shown in FIG. 7, and is opened at its front face side, namely, a driver's side. Further, an insertion hole 32ah through which the attachment bolt 27 can be inserted is formed at a bottom part 32a of the center body part 32.

Accordingly, the center member 30 is attached and fixed to the connection member 28 or 28' via a concave part 52 at the center of the airbag cover 50 by inserting the attachment bolt 27 from a hole 32ah formed on the bottom part 32a of the center body part 32 in a hole 52h formed on a central concave part 52 of the airbag cover 50 and the hole 28ah or 28ah' of the connection member 28 or 28', and fastening the attachment bolt 27 with a nut 25 from the back side of the connection member 28 or 28' so that the center member 30 is disposed substantially at the central portion of the steering wheel 10, i.e. on the extension of the steering shaft 12 at the axial direction.

The horn switch mechanism part 34 is provided with, as shown in FIG. 2, an operation part 34a for closing an opening part of the center body part 32, an urging part 34b such as a spring and so forth for urging the operation part 34a toward the front face side, and a contact part which is electrically connected to the horn through an electric wire and is opened and closed in response to a pushing operation of the operation part 34a, and the horn switch mechanism part 34 is built in the center body part 32. When the operation part 34a disposed substantially at the central portion of the steering wheel 10 is subjected to the pushing operation, the contact of the contact part is closed to issue a sound.

Figure 8A:
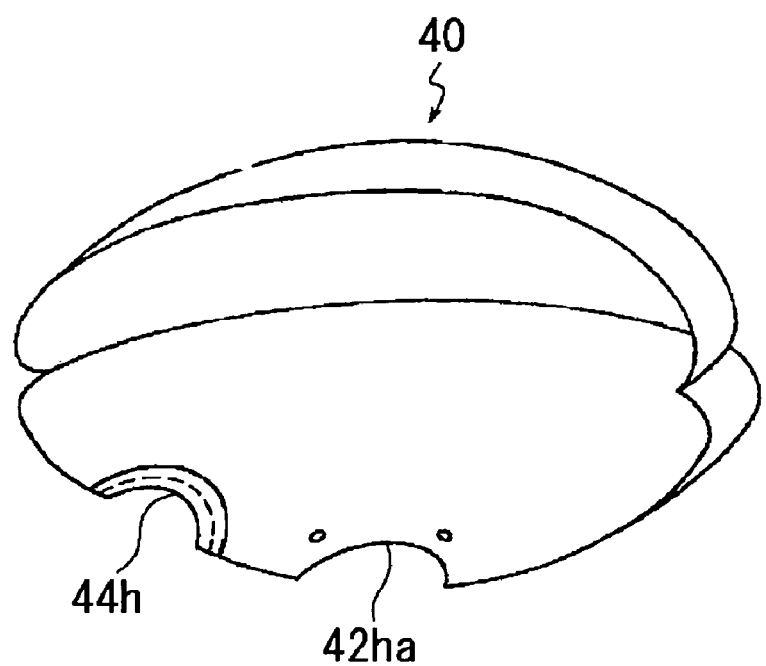
FIG. 8 shows an airbag of the first embodiment, wherein 8A is a sectional view thereof.
FIG. 8B is a rear view thereof.
Figure 8B:
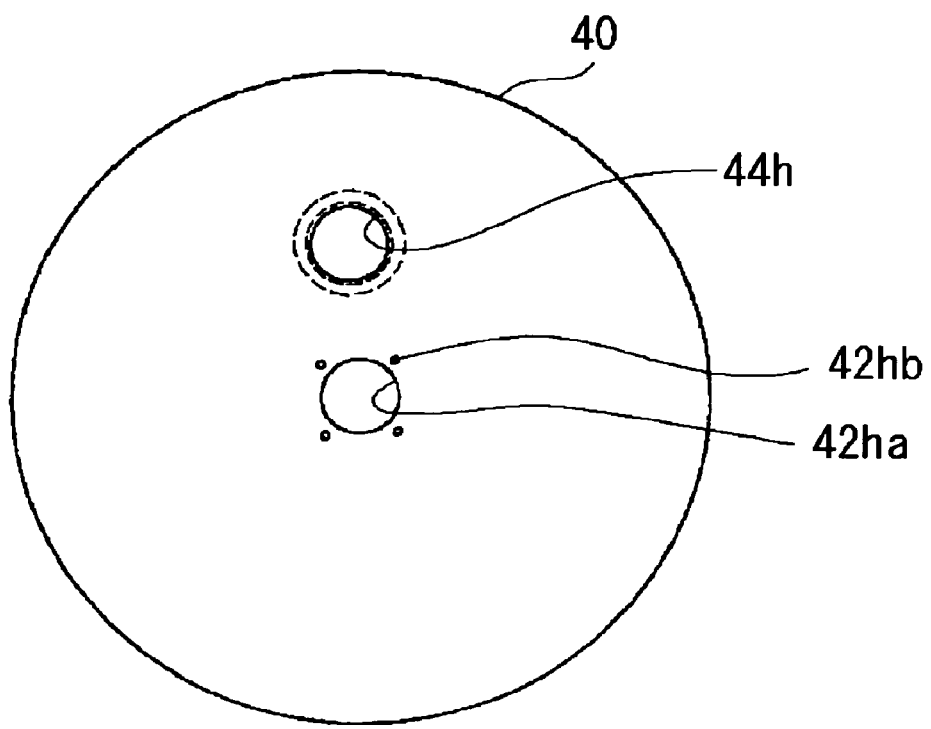

FIG. 8A is a sectional view of the airbag 40 of the first embodiment, and FIG. 8B is a rear view of the same.

As shown in FIG. 8A and FIG. 8B, the airbag 40 is structured to be expandable and spreadable in a bag-shape. To be more concrete, the airbag 40 is structured to be expandable and spreadable in a flat sphere (in an ellipsoid shape), for example, by sewing two outer peripheral edge parts substantially in a circular shape to each other.

An airbag attachment hole 42ha is formed on the back side of the airbag 40 substantially at the central portion thereof. Meanwhile, small holes 42hb shown in FIG. 8A formed on the outer periphery of the airbag attachment hole 42ha are holes for screw cramp.

The airbag 40 is attached to the support member 20 in the manner that the peripheral edge part of the airbag attachment hole 42ha is clamped and held between the front face of the peripheral edge of the hole part 16h of the base plate 16 and the butting faces or rear faces 22b or 22b' of the cushion plate 22 or 22'. In this state, gas jetting part of the inflator 18 (front side portion of the inflator) is disposed inside the airbag 40 and gas jetted from the inflator 18 is introduced into the airbag 40, so that the airbag 40 is structured to be expandable and spreadable in a bag shape from the steering equipment toward the driver seat.

There is formed a through hole 44h at the back side of the airbag 40, namely, at the portion opposite to the expanding and spreading direction of the airbag 40. The through hole 44h has a shape and size of the opening capable of penetrating the center member 30. According to the present embodiment, the through hole 44h is formed substantially at the middle position between the airbag attachment hole 42ha and the outer peripheral edge potion as viewed from the rear face of the airbag 40. Further, an annular reinforcing cloth is sewn to the outer peripheral portion of the through hole 44h.

The airbag 40 is structured such that it is attached to the base plate 16 and the cushion plate 22, and is folded in a state where the connection member 28 is exposed outside of the airbag 40 through the through hole 44h while the airbag 40 is connected to the connection member 28 at the time of expansion and spread of the airbag 40 so that the through hole 44h can pass through the central concave part 52 of the unmoved airbag cover.

Figure 9A:
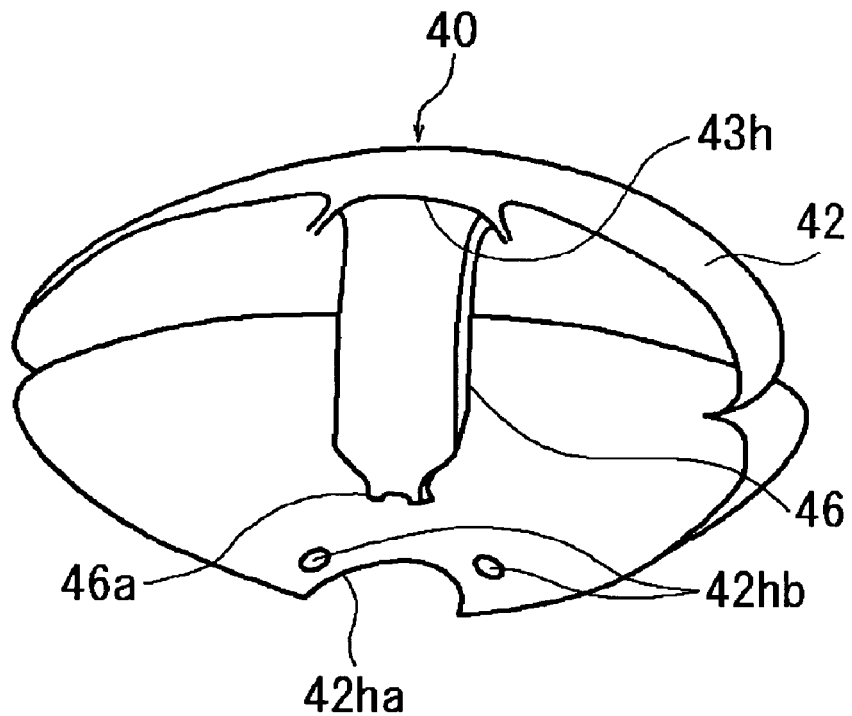
FIG. 9A is a sectional view of an airbag according to the second embodiment.
Figure 9B:
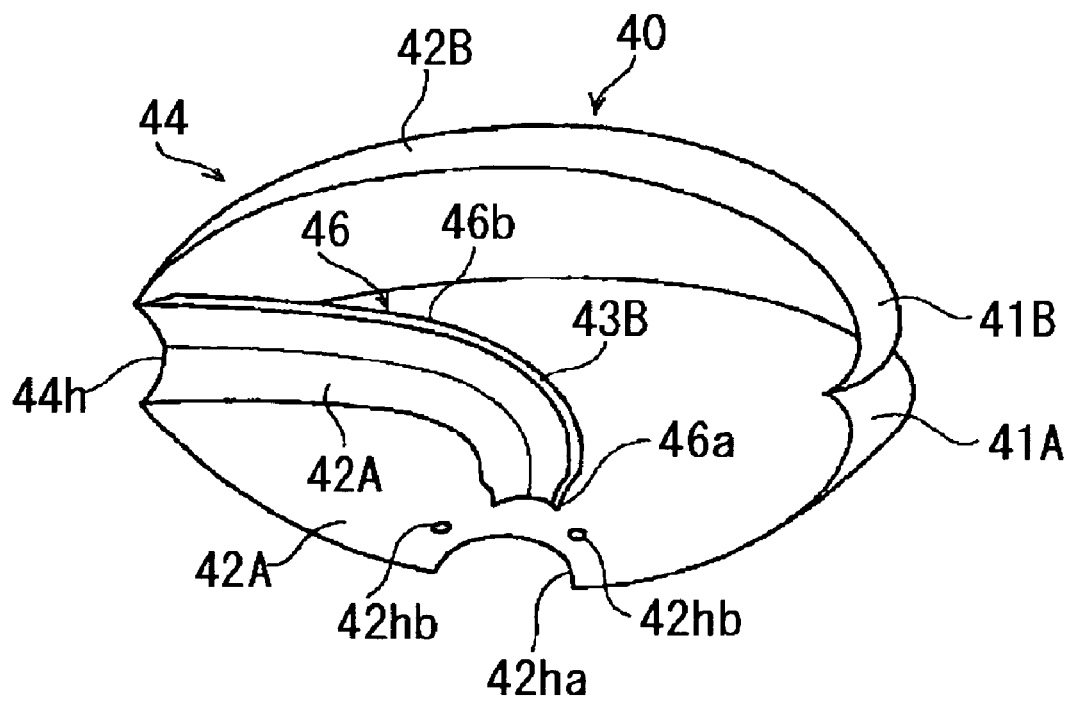
FIG. 9B is a sectional view showing an airbag according to a third embodiments.
Figure 10A:
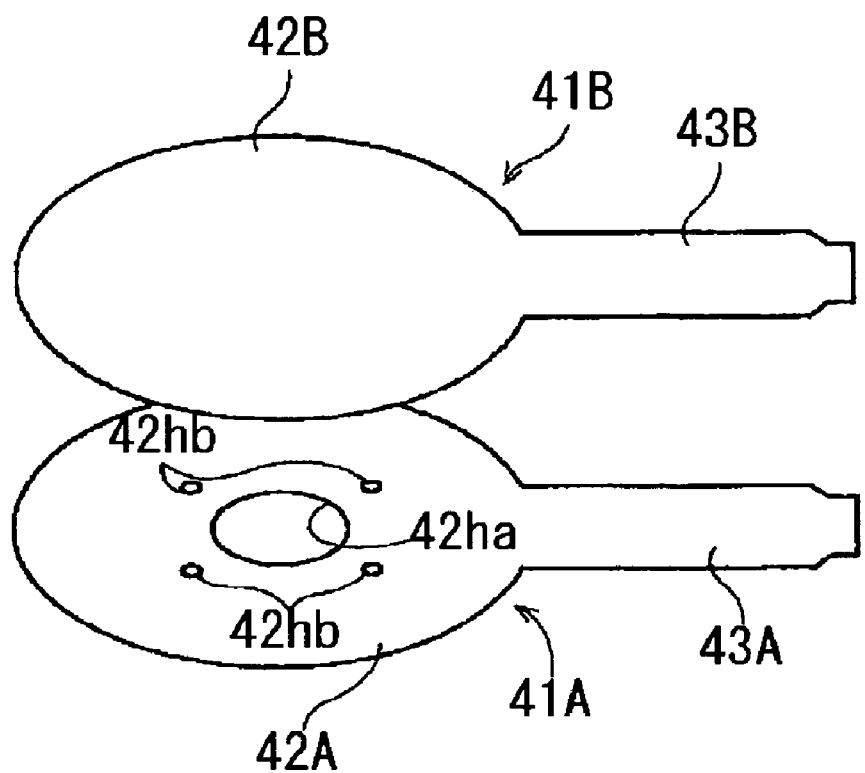
FIG. 10 shows an airbag according to the third embodiment, wherein 10A is an exploded perspective view thereof.
FIG. 10B is a perspective view thereof showing a state where the airbag is sewn.
Figure 10B:
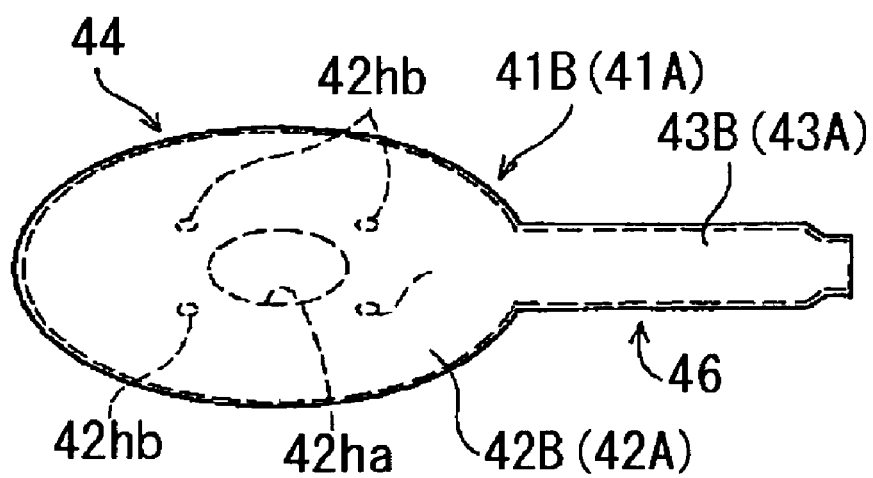

FIG. 9A and FIG. 9B are sectional views showing an airbag 40 according to the second and third embodiments, and FIG. 10A and FIG. 10B are views for explaining a manufacturing procedure of the airbag 40 of the third embodiment.

As shown in FIG. 9, FIG. 10A and FIG. 10B, the airbag 40 is structured by sewing two pieces of base cloths 41A, 41B and it is provided with an airbag body 44 which is expandable and spreadable in a bag shape, and a cylindrical part 46 which extends toward the inside of the airbag body 44.

The airbag body 44 is formed in a bag shape which is spreadable in a flat sphere (substantially in an ellipsoid shape). Further, a through hole 44h through which a concave part 52 of the airbag cover can pass is formed on the outer peripheral portion of the airbag body 44. An airbag attachment hole 42ha is formed on substantially the central portion of the airbag body 44 at the back side and small holes 42hb for use in screw cramp are formed on the periphery of the airbag attachment hole 42ha.

The airbag 40 is attached to a support member 20 in the manner that the peripheral edge portion of the airbag attachment hole 42ha is clamped and held between the peripheral edge portion of a hole 16h of a base plate 16 and a frame part of a cushion plate 22. In this state, gas jetting part of an inflator 18 (a front side portion of the inflator) is disposed inside the airbag 40, and gas jetted from the inflator 18 is introduced into the airbag 40, so that the airbag body 44 is structured to be spreadable from a steering equipment toward a driver seat.

The cylindrical part 46 is formed substantially in a cylindrical shape extending from the through hole 44h toward the inside of the airbag body 44. A tip side opening part 46a of the cylindrical part 46 is formed in the manner that it can be held by the concave part 52 of the airbag cover not to come out. To be concrete, an opening diameter of the tip side opening part 46a of the cylindrical part 46 is formed smaller than the maximum outer diameter of the concave part 52.

A peripheral barrel part 46b of the cylindrical part 46 except the tip side opening part 46a is formed so that the concave part 52 can pass the peripheral barrel part 46b. To be more concrete, an inner diameter of the peripheral barrel part 46b is larger than a maximum outer diameter of the concave part 52. An insertion hole of the cylindrical part 46, the peripheral barrel part 46b and the tip side opening part 46a are respectively set to have a size through which the connection member 28 or 28' can pass.

In a state where the airbag 40 is folded, the cylindrical part 46 is folded around the center member 30 and the airbag body 44 is folded around the cylindrical part 46. In a state where the airbag 40 is folded, it is preferable that the airbag attachment hole 42ha, the tip side opening part 46a of the cylindrical part 46 and the through hole 44h come into line with one another. By doing so, the connection member 28 or 28' can be exposed on the front side of the airbag 40 with ease through the airbag attachment hole 42ha, the tip side opening part 46a of the cylindrical part 46 and the through hole 44h.

The airbag 40 is manufactured by sewing two pieces of base cloths 41A, 41B in the manner set forth hereunder. First, as shown in FIG. 10A, two base cloths are prepared. The base cloths 41A, 41B are formed to have cylinder forming cloth parts 43A, 43B extended from a part of the outer peripheral portions of the bag forming cloth parts 42A, 42B. According to the present embodiment, although the bag forming cloth parts 42A, 42B are formed substantially in a circular shape, they are not always formed substantially in a circular shape, and may be formed substantially in a square shape. The cylinder forming cloth parts 43A, 43B are formed substantially in a belt shape and extended outward in a radial direction from each part of the outer periphery of the bag forming cloth parts. The tip parts of the cylinder forming cloth parts 43A, 43B are formed somewhat narrower. Meanwhile, the airbag attachment hole 42ha is formed substantially at a central portion of the bag forming cloth part 42A at one side, and small holes 42hb for screw cramp are formed at the periphery of the airbag attachment hole 42ha.

The outer peripheral edge portions of the base cloths 41A, 41B are sewn together except those of the cylinder forming cloth parts 43A, 43B extended from the base cloths 41A, 41B, then both side edge portions of the cylinder forming cloth parts 43A, 43B are sewn together (refer to FIG. 10B).

Finally, a bag shaped part structured by the bag forming cloth parts 42A, 42B is reversed by pulling out the bag forming cloth parts 42A, 42B from the airbag attachment hole 42ha.

As mentioned above, the bag-shaped airbag body 44 is formed by sewing the outer peripheral edge portions of the bag forming cloth parts 42A, 42B together. Further, the portions of the cylinder forming cloth parts 43A, 43B extended from the bag forming cloth parts 42A, 42B, of the outer peripheral edge portions of the bag forming cloth parts 42A, 42B, are non-sewn portions, and the through hole 44h through which the concave part 52 can pass is formed on the non-sewn portions. Further, the cylindrical part 46 extended from the through hole 44h toward the inside of the airbag body 44 is formed by sewing both side edge portions of the cylinder forming cloth parts 43A, 43B together.

Meanwhile, it is preferable that the lengthwise dimensions of the cylindrical part 46 is larger than a distance for connecting the concave part 52 and the through hole 44h in a state where the airbag body 44 is naturally expanded and spread without any restriction when the airbag 40 is attached to the support member 20.

Figure 11A:
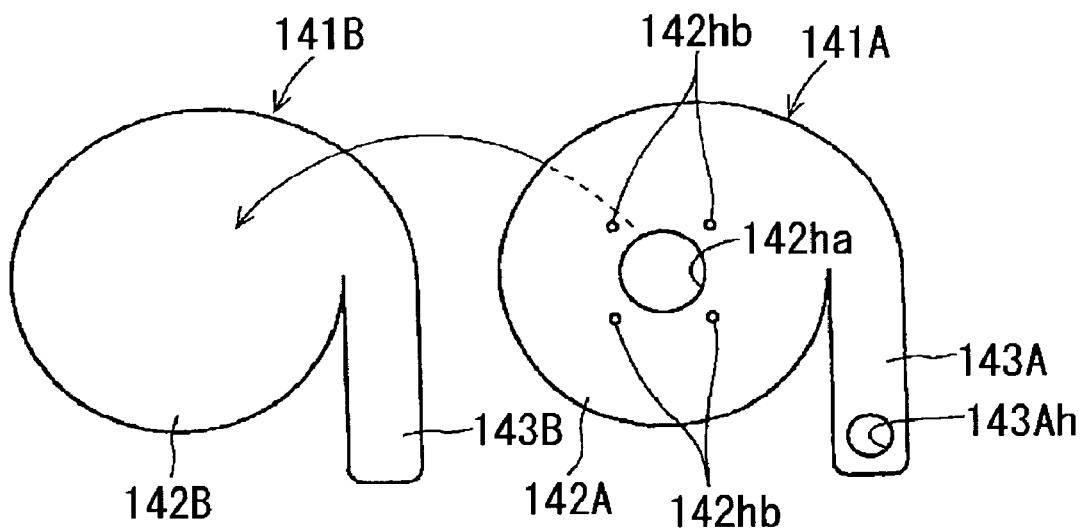
FIG. 11A is an exploded perspective view thereof.
Figure 11B:
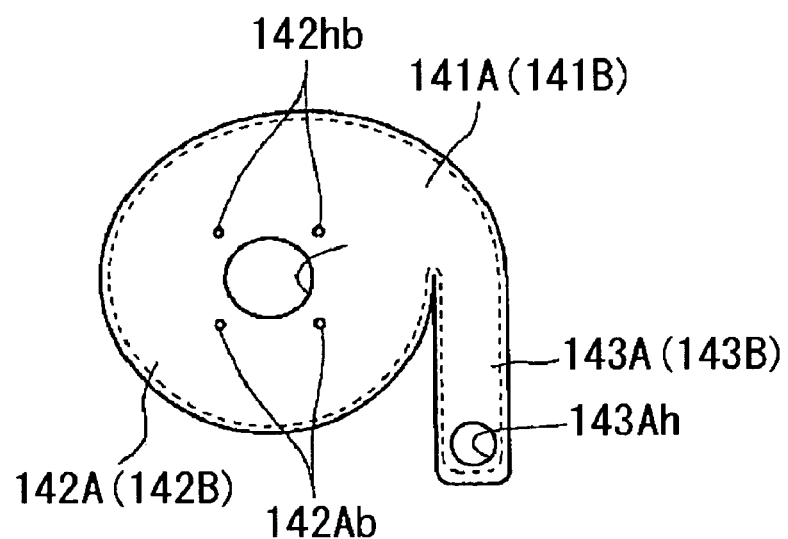
FIG. 11B is a perspective view thereof showing a state where the airbag is sewn.

FIG. 11A and FIG. 11B are views for explaining a manufacturing process of an airbag according to the fourth embodiment.

The airbag according to this modification are formed of two pieces of base cloths 141A, 141B. The base cloths 141A, 141B have cylinder forming cloth parts 143A, 143B extended from a part of the outer peripheral portions of bag forming cloth parts 142A, 142B. According to the present embodiment, the bag forming cloth parts 142A, 142B are formed substantially in a circular shape while the cylinder forming cloth parts 143A, 143B are formed substantially in a belt-shape. The cylinder forming cloth parts 143A, 143B are extended tangentially along the outer peripheral potions of the bag forming cloth parts 142A, 142B. Further, an airbag attachment hole 142ha is formed on the bag forming cloth part 142A of one side. Still further, an insertion hole 143Ah for a holding purpose is formed on the cylinder forming cloth part 143A of one side. The insertion hole 143Ah for a holding purpose has an opening diameter which is smaller than the maximum outer diameter of a concave part 52, and formed to be held by the concave part 52. The insertion hole 143Ah for a holding purpose may be formed at the side of the cylinder forming cloth part 143B.

Then, the outer peripheral edge parts of both the base cloths 141A, 141B are sewn together along the entirety thereof (refer to FIG. 11B).

Finally, the airbag is manufactured by reversing a bag shaped part structured by the bag forming cloth parts 142A, 142B while pulling out the bag forming cloth parts 142A, 142B from the airbag attachment hole 142ha.

Figure 12A:
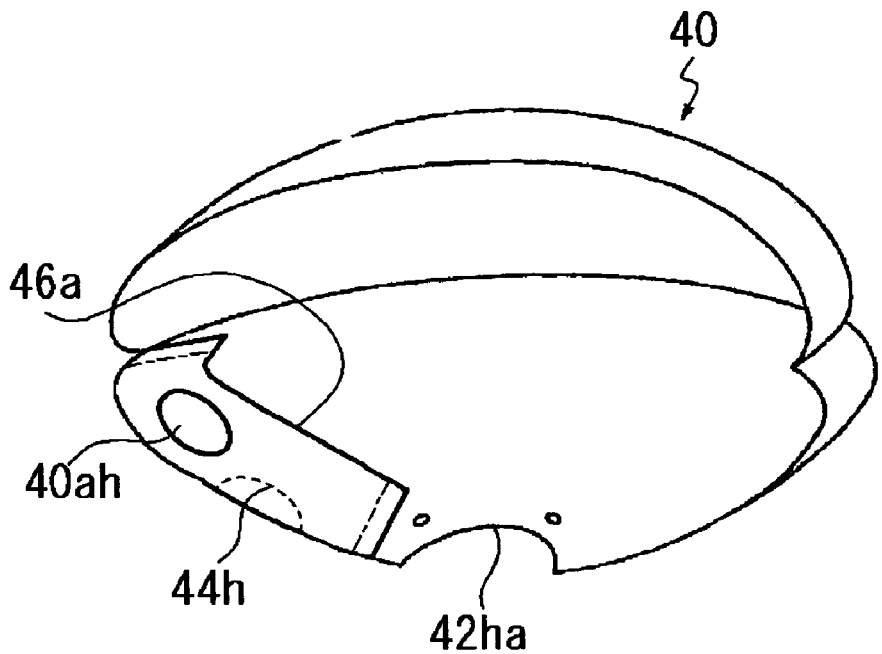
FIG. 12A is a sectional view of an airbag according to a fifth embodiment.
Figure 12B:
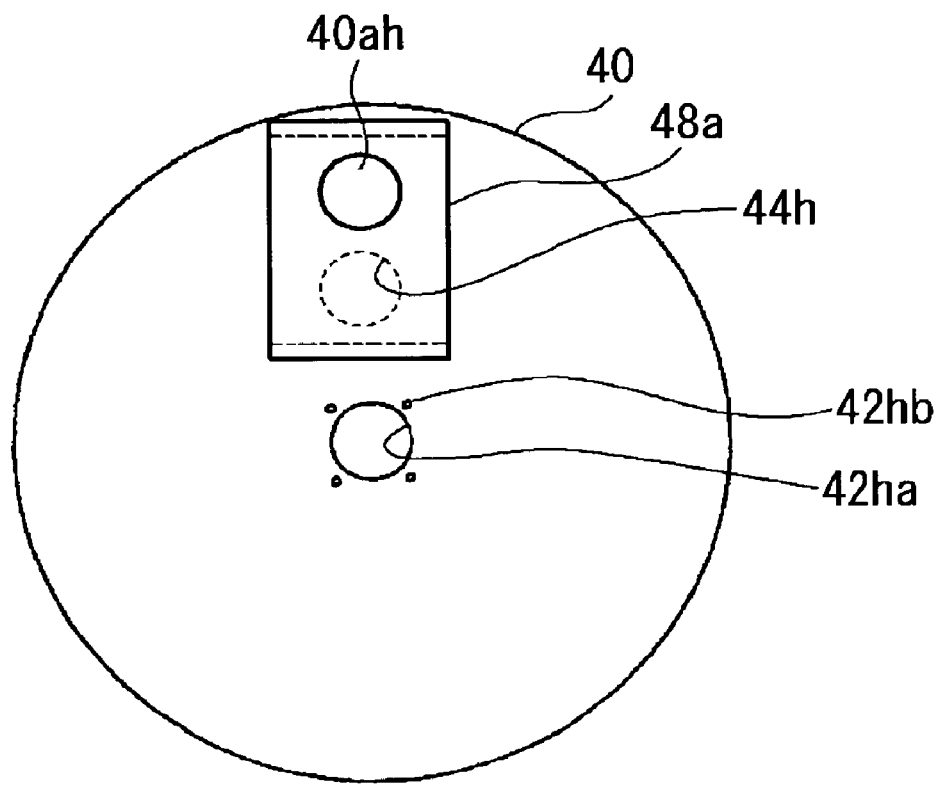
FIG. 12B is a rear view thereof.

FIG. 12A is a sectional view showing an airbag 40 according to the fifth embodiment, and FIG. 12B is a rear view of the airbag 40.

As shown in FIG. 12A and FIG. 12B, the airbag 40 is structured to be expandable and spreadable in a bag shape. To be more concrete, the airbag 40 is formed in a bag shape which is spreadable in a flat sphere (in an ellipsoid shape), for example, by sewing the outer peripheral edge portions of two pieces having substantially a circular shape.

An airbag attachment hole 42ha is formed substantially at the central portion of the back side of the airbag 40. Meanwhile, small holes 42hb formed at the outer periphery of the airbag attachment hole 42ha in FIG. 12A are holes for screw cramp.

The airbag 40 is attached to a support member 20 in the manner that the peripheral edge portion of the airbag attachment hole 42ha is clamped and held between the front face of the peripheral edge of a hole 16h of a base plate 16 and butting faces or rear faces 22b or 22b' of a cushion plate 22 or 22'. In this state, gas jetting part of an inflator 18 (front side portion of the inflator) is disposed inside the airbag 40 and gas jetted from the inflator 18 is introduced into the airbag 40, so that the airbag 40 is structured such that it is expandable and spreadable in a bag shape from a steering equipment toward a driver seat.

There is formed a through hole 44h (a slit having substantially the same diameter as the through hole 44h, when opened, will do) at the back side of the airbag 40, namely, at the portion opposite to the expanding and spreading direction of the airbag 40. The through hole 44h has a shape and size of an opening capable of penetrating a central concave part 52 of an airbag cover 50. According to the present embodiment, the through hole 44h is formed substantially at the middle position between the airbag attachment hole 42ha and the outer peripheral edge potion as viewed from the rear face of the airbag 40, and a patching-shape body 48a made of the same material as the base cloth of the airbag is sewn to the base cloth of the airbag 40 in a state to be movable relative thereto. A hole 40ah having substantially the same diameter of the through hole 44h of the airbag (a slit which becomes substantially the same diameter as the through hole 44h, when opened, will do) is formed on the patching-shape body 48a at a position to be displaced from and not to overlap the through hole 44h, wherein the hole 40ah of the patching-shape body 48a and the through hole 44h are aligned in position by moving the patching-shape body 48a and the base cloth of the airbag relative to each other when the airbag 40 is folded and housed in the airbag cover 50, and they are held by ribs provided at the back side of a concave part 52 of the airbag cover, described later.

The airbag 40 is structured such that it is attached to the base plate 16 and the cushion plate 22 and is folded in a state where it is exposed outside of the airbag 40 through the through hole 44h and the hole 40ha of the patching-shape body 48a through which the connection member 28 is aligned in position, while the airbag 40 is connected to the connection member 28 at the time of expansion and spread thereof, so that the through hole 44h and the hole 40ha can pass through the central concave part 52 of the unmoved airbag cover. Such an airbag can be used in the same manner as the airbag 40.

Figure 13A:
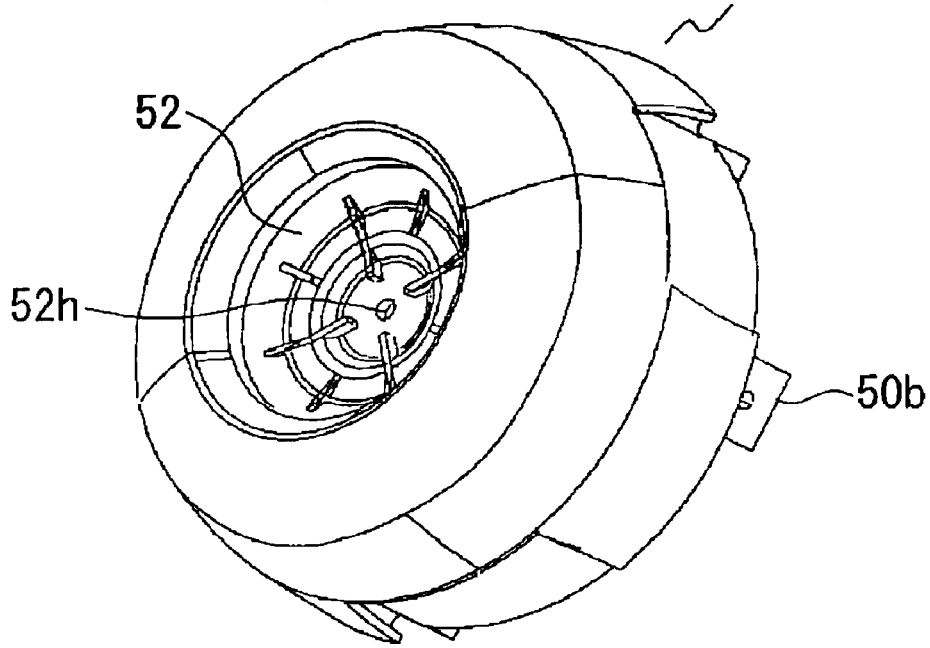
FIG. 13A is a perspective view thereof.

FIG. 13A is a perspective view of the airbag cover 50. As shown in the figure, the airbag cover 50 is formed substantially in a bowl shape with resin and provided with the concave part 52 of substantially a frustum-shape for housing the center member 30 at the center thereof, as already described.

The airbag cover 50 is fixed to the connection member 28 or 28' by inserting the bolt 27 in the attachment hole 52h of the concave part 52, in a state of covering the airbag 40 which is folded around the connection member 28 or 28', and it is fixed to the base plate 16 via the attachment pieces 16a, described later.

Meanwhile, in a state where the center member 30 is attached to the concave part 52 of the airbag cover, the front face of the operation part 34a is substantially flush with that of the airbag cover 50 as shown in FIG. 2.

Figure 13B:
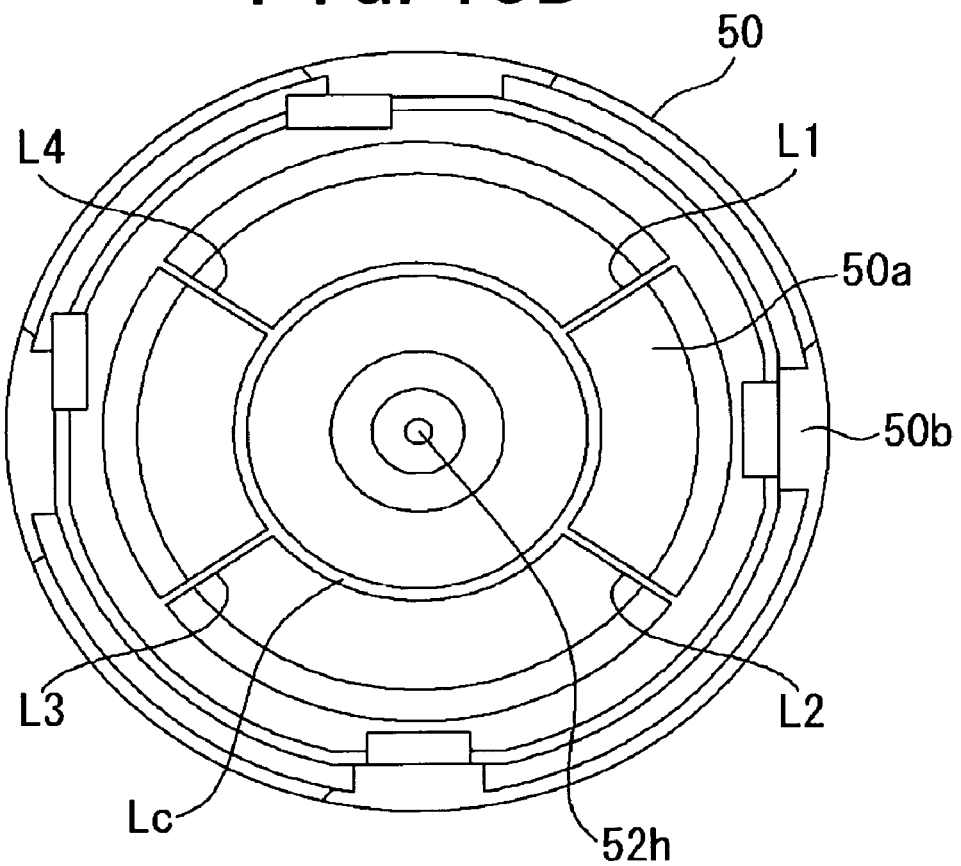
FIG. 13B is a rear view thereof.

FIG. 13B is a rear view of the airbag cover 50. As shown in the figure, there are provided, on the rear face of the airbag cover 50, groove-shaped tear lines which can be cut (split) while leaving the central concave part 52 fixed by the connection member 28 or 28' at the time of expansion and spread of the airbag 40. That is, there are provided, on the rear face of the airbag cover 50, a group of tear lines comprising a circular tear line Lc around the central concave part 52 and a plurality of, for example, four pieces of tear lines L1 to L4 extended radially, from the circular tear line Lc so as to be divided into a plurality of cover pieces 50a while leaving the central portion upon receipt of an expansion pressure of the airbag. Further, attachment pieces 50b provided for each cover piece 50a are fastened individually to attachment pieces 16a with screws at the back side of the base plate 16 by cutting and raising the circular portion of the base plate 16 made of metal so that the airbag cover 50 is divided into each cover piece 50a which can be opened individually at the time of expansion of the airbag 40.

Figure 14:
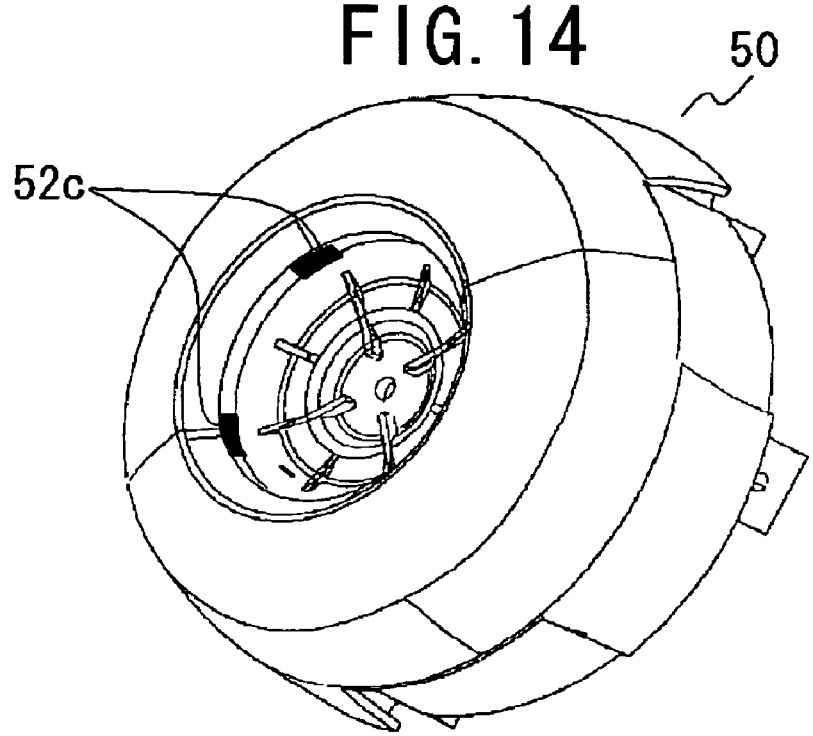
FIG. 14 is a perspective view of an airbag cover according to the second embodiment.

FIG. 14 is a perspective view showing another example of an airbag cover and is a perspective view like FIG. 13A. The airbag cover 50 is also provided with a circular tear line Lc around a central concave part 52 and a plurality of, for example, four pieces of tear lines L1 to L4 extended radially from the circular tear line Lc, which is however different from the airbag cover 50 shown in FIG. 13A only in respect of cut parts 52c formed in advance at a part of the circular tear line Lc around the central concave part 52, but which is the same as those the airbag cover 50 show in FIG. 13A in respect of other components.

Each open piece 50a of the airbag cover 50 can be smoothly and reliably opened at the time of expansion of the airbag by providing the cut parts 52c on the tear line Lc of the airbag cover 50.

Since the cut parts 52c are obstructed by a decorative member, they can not be seen from the outside, and there is no likelihood of impairing an external appearance of the airbag device.

With the configuration set forth above, when the airbag 40 is expanded and spread, the airbag cover 50 is pushed and split at the tear line L around the center member 30 by an expansion and spread force at that time, and the split cover pieces are opened outward respectively while leaving the bowl shaped central concave part 52. At this point in time, the tear lines are formed so that the cover pieces 50a can be completely separated from one another so as to be independently opened, while the attachment pieces 16a of the base plate 16 are formed of a plastic deformable material and the attachment pieces 16a are not returned to the original shape once they are once deformed.

Figure 15:
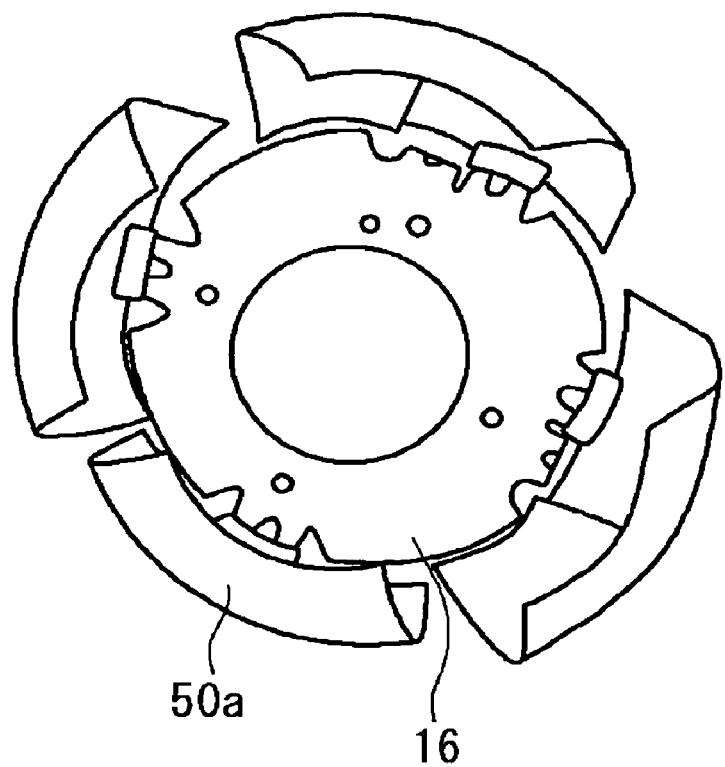
FIG. 15 is a view showing a state where the airbag cover is opened when the airbag is expanded, which is viewed from the back side of a base plate.

FIG. 15 is a view of each cover piece 50a in an open state as viewed from the base plate 16 side. As shown in the figure, the airbag cover 50 is structured such that it can be divided in each cover piece 50a at the time of expansion of the airbag 40, and the attachment pieces 16a keep the twisting deformed state so that the airbag 40 is smoothly expandable upon receipt of the pressure from the inflator 18.

At the time of expansion of the airbag, the airbag 40 is expanded outward while guided by a frustum-shaped face which is gradually increased in diameter toward the front side at the outside of the rear face of the central concave part 52 when the hole 44h (or slit will do) formed on the airbag or the portion of the cylindrical part 46 passes through the periphery of the central concave part 52 of the airbag cover which remains without being cut. That is, the airbag 40 is expanded while passing through or passing the unmoved central concave part 52 of the airbag cover.

Since the airbag is expanded as such, expansion of the airbag in a forward direction is slowed somewhat in its speed by a resistance at the time of passing through the unmoved central concave part of the airbag cover. Accordingly, the airbag is first expanded laterally so that the expanding airbag 40 can mitigate a pressure struck directly to the driver.

Next, an assembling procedure of the airbag device disclosed above is now explained.

When assembling the airbag 40, firstly the airbag 40 or an airbag body part 44 and the cylindrical part 46 are appropriately folded at a front face side area of the base plate 16, and they are housed in the airbag cover 50 in a state where the through hole 44h of the airbag 40 or the insertion hole 43h of the cylindrical part 46 opposes the concave part 52 of the airbag cover, while the attachment feet 28c or 28c' of the connection member 28 or 28' are fitted in the concave parts 22c or 22c' provided at the rear face of the cushion plate 22 or 22', and in this state, the peripheral edge part of the airbag attachment hole 42ha is clamped and held between the peripheral edge part of the hole 16h of the base plate 16 and the butting faces 22b or 22b' of the cushion plate 22 or 22', causing the base plate 16 to overlap the cushion plate 22 or 22'. Thereafter, the nut 25 is threaded in the attachment bolt 27 protruding toward the inside of the airbag cover 50 from the backside thereof by use of the hole 16h of the inflator 18 on the base plate 16, while the horn switch mechanism part 34 is built in the center body part 32, and the base plate 16, the cushion plate 22 and the inflator are screwed.

At this point in time, the connection member 28 or 28' is disposed in the airbag 40 through the airbag attachment hole 42ha or disposed in the cylindrical part 46 through the airbag attachment hole 42ha or the tip side opening part 46a of the cylindrical part 46. Further, the tip side opening part 46a of the cylindrical part 46 is formed to be smaller in diameter than the maximum diameter of the central concave part 52 of the airbag cover 50 or it is clamped and held by the central concave part 52, so that the cylindrical part 46 is prevented from being come out from the central concave part 52 at the time of expansion of the airbag. With procedures set forth above, the assembly of the airbag device shown in FIG. 2 is completed.

Spreading operation of the airbag device is explained.

The inflator 18 is first ignited by a shock detection caused by collision of a vehicle and so forth, causing gas to be generated in the inflator 18 and introduced into the airbag 40.

The airbag cover 50 receives an expansion force of the airbag when the airbag 40 starts the expansion, and it is split along the tear lines L1 to L4 and Lc, namely, it is split while leaving the central concave part 52, causing air cover piece 50a to be radially expanded.

Figure 16:
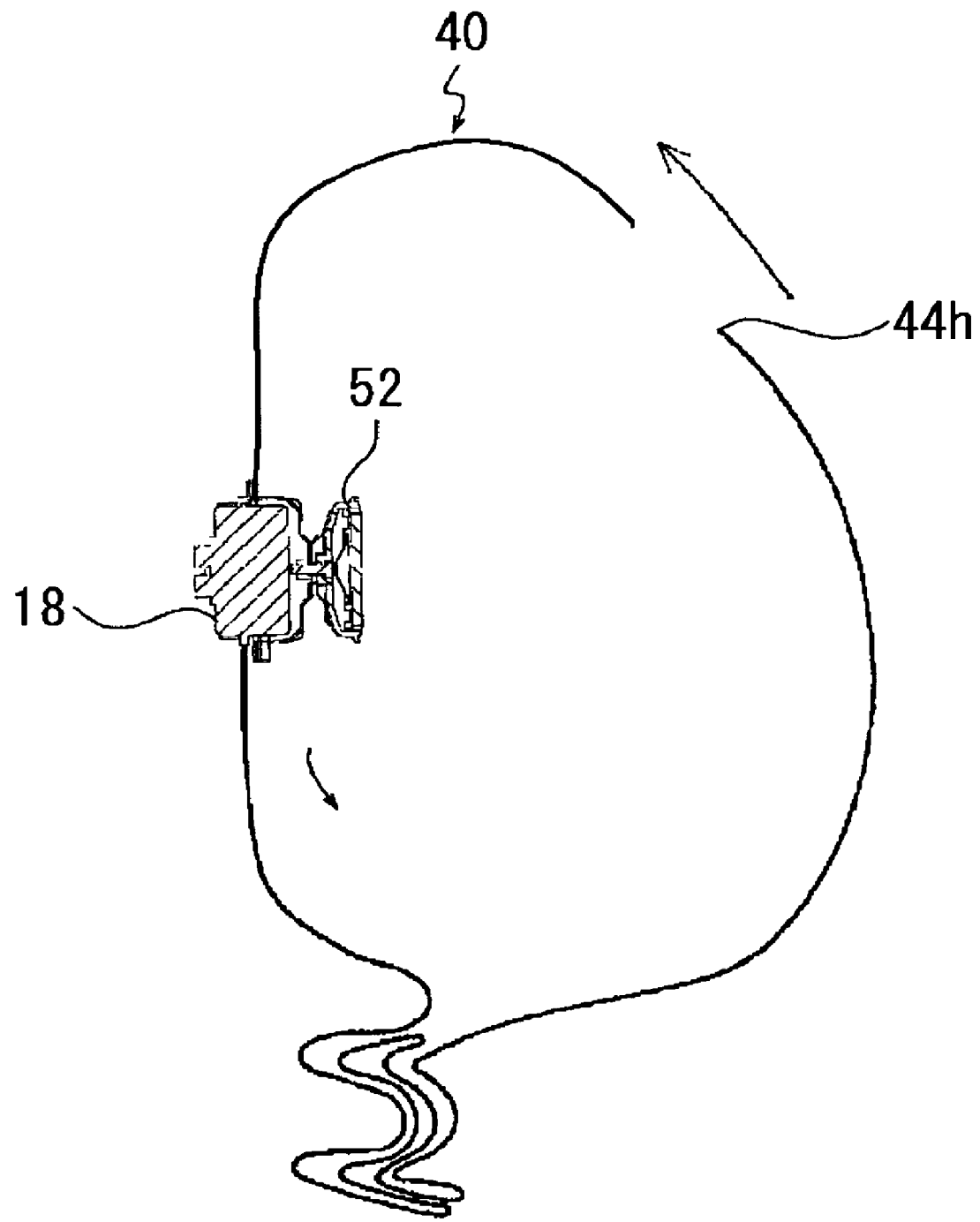
FIG. 16 is a sectional view showing a state of early stage of the expansion of the airbag of the first embodiment.

According to the airbag of the first embodiment, in the early stage where the airbag 40 starts the expansion after the airbag cover 50 is split, the airbag 40 is slightly expanded about the periphery of the inflator 18 as shown in FIG. 16.

Further, when gas is introduced into the airbag 40 of the first embodiment, the airbag 40 is expanded while the concave part 52 comes out from the through hole 44h as shown in FIG. 16.

Figure 18:
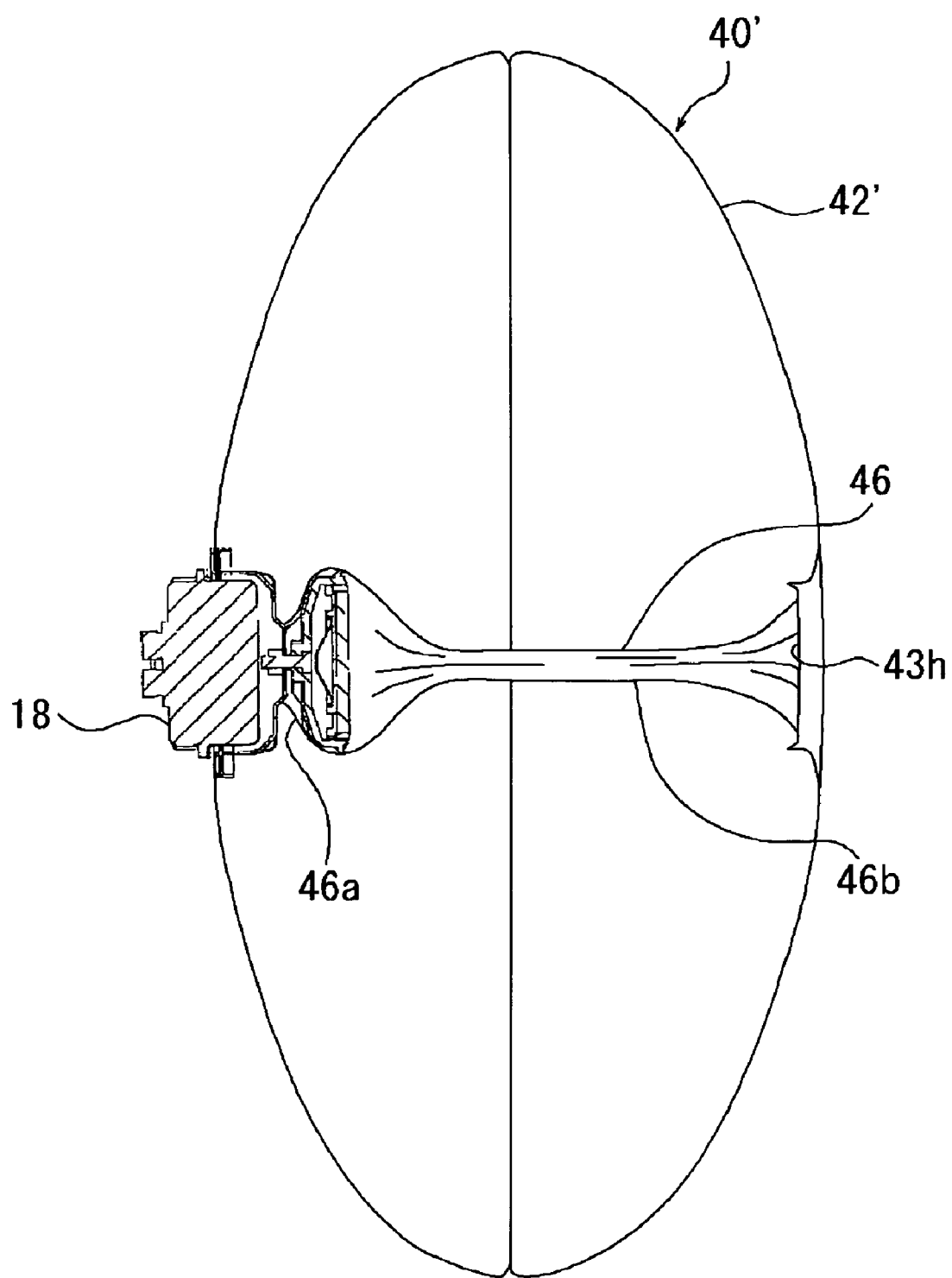
FIG. 18 is a sectional view showing a state where expansion of the airbag of the second embodiment is completed.

Likewise, according to the airbag of the second embodiment, when gas is introduced into the airbag 40', the airbag 40' is expanded while the concave part 52 enters the cylindrical part 46 as shown in FIG. 18.

Figure 17:
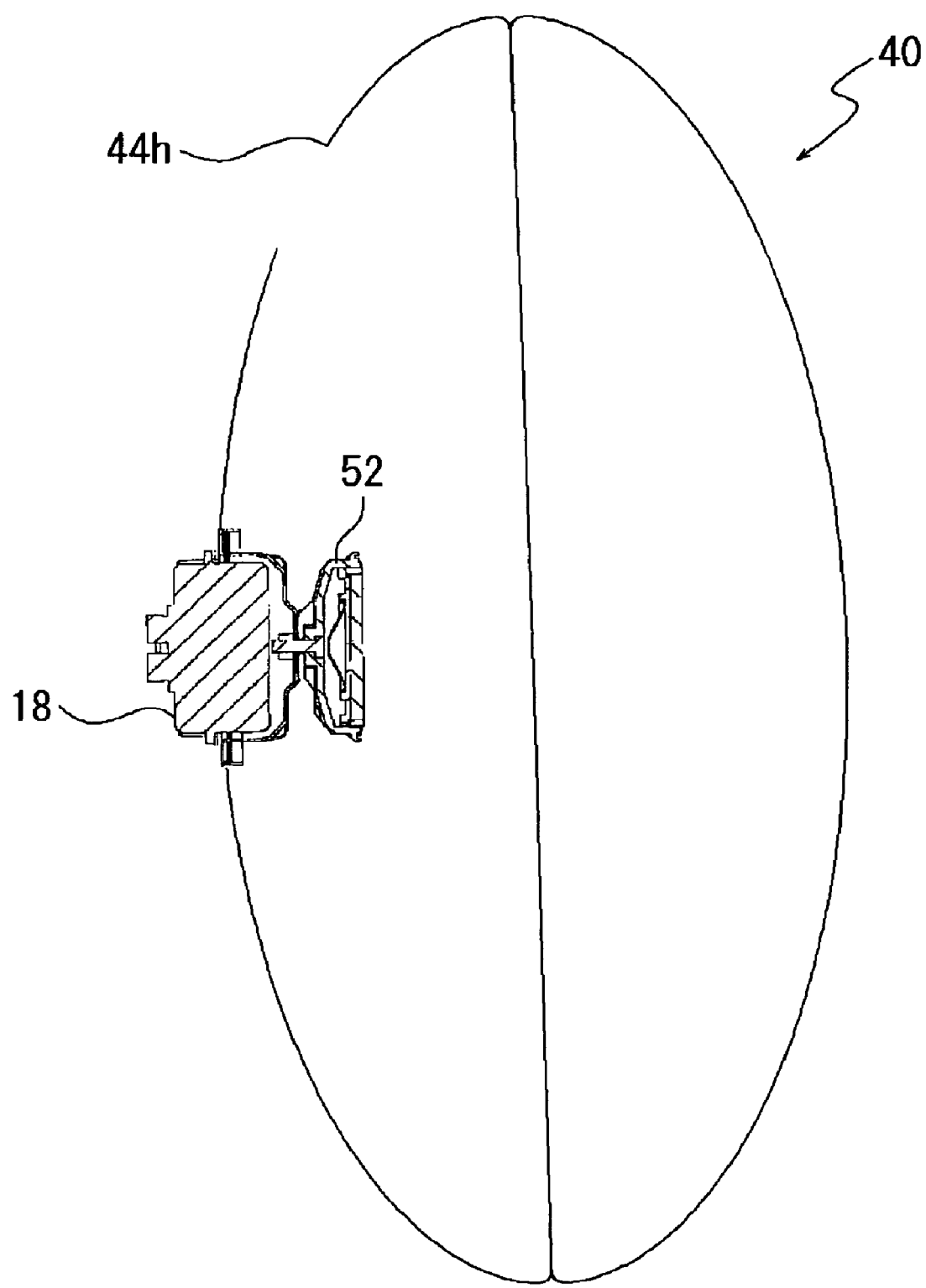
FIG. 17 is a sectional view showing a state where expansion of the airbag of the first embodiment is completed.

After the airbag is expanded to some extent, according to the airbag 40 of the first embodiment, it continues expansion at a part unevenly distributed under the concave part 52, namely, mainly at a front side part or lower part of the airbag 40, and it is expanded and spread in a flat sphere which is a natural expansion shape of the airbag 40 as shown in FIG. 17 in the manner that the part where the through hole 44h of the airbag 40 is formed is pushed away from above to the backside. Further, in the case of the airbag 40 of the second embodiment, it is expanded and spread in a flat sphere as shown in FIG. 18.

According to the airbag 40 of the first embodiment, the through hole 44h is positioned at the back face side of the airbag 40 after the airbag 40 is expanded to some extent, so that gas is not excessively leaked through the through hole 44h, and jetting of the leaked gas toward a driver can be prevented. Upon completion of the expansion of the airbag 40, gas inside the airbag 40 is discharged through the through hole 44h provided at the backside of the airbag 40.

According to the airbag 40 of the second embodiment, since the tip side opening part 46a of the cylindrical part 46 prevents the concave part 52 from passing through it, the airbag 40 is not expanded to a length exceeding the length of the cylindrical part 46.

Figure 19:
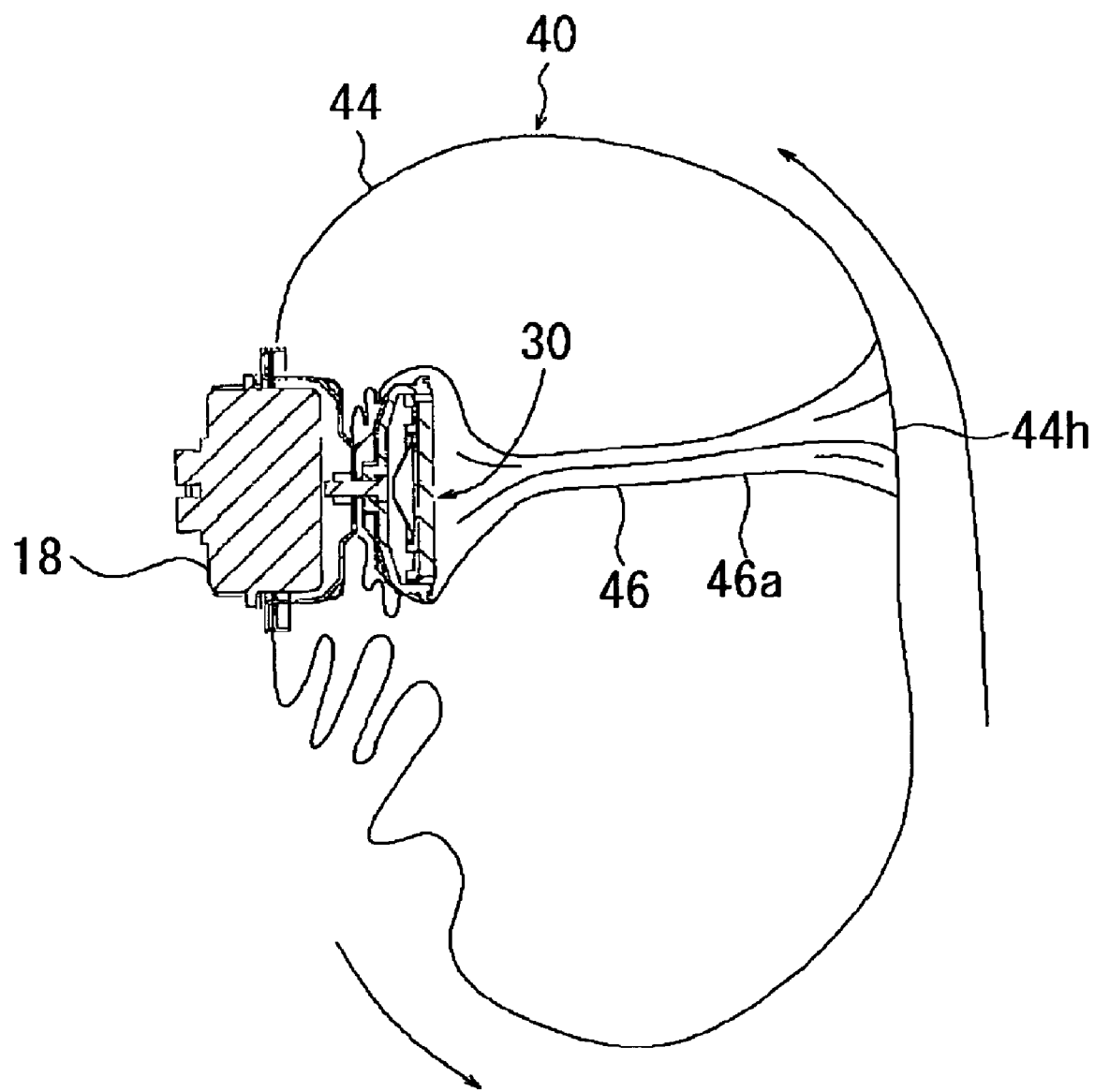
FIG. 19 is a sectional view showing a state of early stage of expansion of the airbag of the third embodiment.

According to the airbag 40 of the third embodiment, in the early stage where the airbag body 44 starts the expansion after the airbag cover 50 is split, the airbag body 44 is expanded about the periphery of the inflator 18 as shown in FIG. 19, and the cylindrical part 46 is extended on the extension at the front side of the center member 30 inside the airbag body 44.

Figure 20:
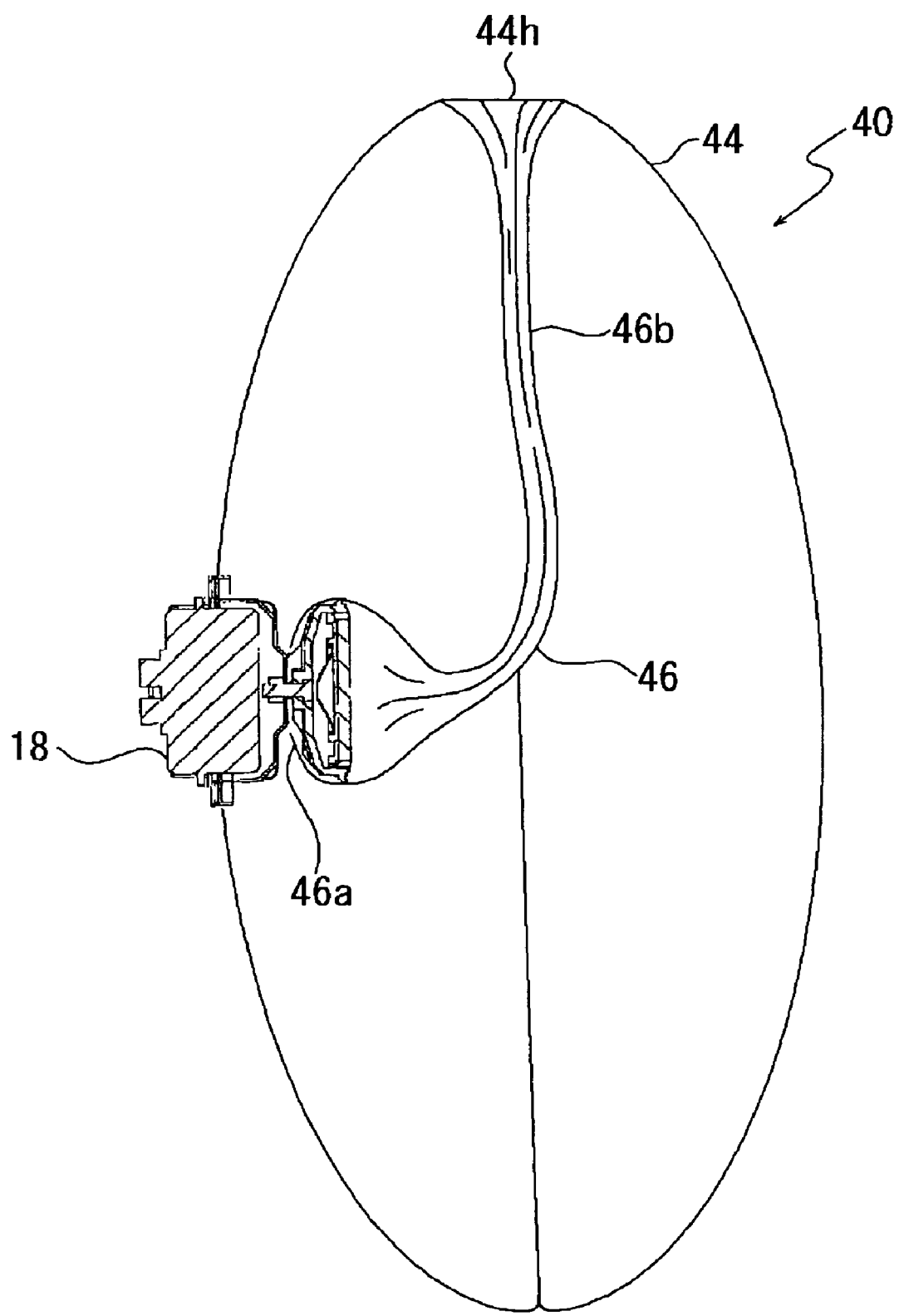
FIG. 20 is a sectional view showing a state where expansion of the airbag of the third embodiment is completed.

After the airbag body 44 is expanded to some extent, a part unevenly distributed under the center member 30 of the airbag body 44, namely, mainly the lower part of the cylindrical part 46 of the airbag body 44 continues the expansion, so that the airbag body 44 is expanded and spread in a flat sphere which is a natural expansion shape of the airbag body 44 in the manner that the part where the through hole 44h of the airbag body 44 is formed is pushed away upward as shown in FIG. 20.

According to the airbag device having the structure set forth above, since the through hole 44h is opened at the outer peripheral part of the airbag body 44, namely, at the position not directing to a driver of the driver seat, even if gas is leaked through the through hole 44h, leaked gas is hardly jetted toward the driver. Meanwhile, according to the present embodiment, although the through hole 44h is directed upward but it may be directed to the side part or lower part or oblique side part. In short, the through hole 44h may be formed at the position not directing to the driver on the driver seat at the time of spread of the airbag.

Although many pieces of cloths are conventionally sawn together to form a desired expansion curved shape so as to expand and spread the airbag in a doughnut shape, according to the airbag device of the present invention, the airbag 40 can be sawn up by sawing two pieces of base cloths so that the airbag 40 can be manufactured with ease.

Further, since the tip part of the cylindrical part 46 is held by the concave part 52 not to come out therefrom at the time of spread of the airbag 40, it is not necessary to attach and fix the tip part of the cylindrical part 46 to the concave part 52 side in the stage of assembling the airbag 40. Accordingly, an assembling operation of the airbag 40 can be implemented by a relatively simple structure with ease.

More further, since the concave part 52 has a tapered peripheral face which is gradually increased toward a spreading direction of the airbag 40, the tip side opening part 46a of the cylindrical part 46 is gradually pushed and spread along the tapered peripheral face of the concave part 52 to move toward the spreading direction of the airbag 40 at the time of spread of the airbag 40, so that the tip side opening part 46a is held by the large diameter portion of the concave part 52 not to come out. Accordingly, there is an advantage that the tip side opening part 46a of the cylindrical part 46 is held by a come-out prevention holding part 30a not to come out stably and reliably.

Here, the concave part 52 is not always to be formed in a frustum-shape having a tapered peripheral face, and it may be formed to have a portion which protrudes in a collar shape, and the tip side opening part 46a of the cylindrical part 46 may be held by the collar portion not to come out.

Further, provided that the cylindrical part 46 may have dimensions which are longer than a distance connecting between the through hole 44h and the concave part 52 in a state where the airbag body 44 is naturally expanded and spread, a large force caused by an expansion of the airbag is not applied to the cylindrical part 46 at the time of expansion of the airbag 40, so that an attachment part and so forth between the cylindrical part 46 and the concave part 52 do not need strong enforcement, thereby enabling the airbag device to be manufactured at a relatively low cost.

According to the airbag of the fifth embodiment, the airbag 40 is expanded outward while guided along the frustum-shaped face which is gradually increased toward the front side of the rear face outside of the central concave part 52 when the through hole 44h formed in the airbag and the hole of the patching-shape body 48a pass the periphery of the central concave part 52 of the airbag cover which is left without being cut at the time of expansion of the airbag. That is, the airbag 40 is expanded while passing through the periphery of the unmoved central concave part 52 of the airbag cover. The through hole 44h and the hole 40ah of the patching-shape body 48a pass through the concave part 52, and they are returned to an original relation, namely, to a state where they are displaced from each other, whereby the through hole 44h of the airbag 40 is completely closed by the respective cloth pieces to prevent gas from being leaked.

Since the airbag is expanded as such, expansion of the airbag in a forward direction is slowed somewhat in its speed by a resistance at the time of passing through the unmoved central concave part of the airbag cover. Accordingly, the airbag is first expanded laterally so that the expanding airbag 40 can mitigate a pressure struck directly to the driver.

Spreading operation of the airbag device is explained.

The inflator 18 is first ignited by a shock detection caused by collision of a vehicle and so forth, causing gas to be generated in the inflator 18 and introduced in the airbag 40. The airbag cover 50 receives an expansion force of the airbag when the airbag 40 starts the expansion, and it is split along the tear lines L1 to L4 and Lc, namely, it is split while leaving the central concave part 52, causing air cover piece 50a to be radially expanded. At this point in time, since the through hole 44h of the airbag 40 is closed by the patching-shape body 48a of the airbag 40 as described hereinbefore, in the airbag 40, the patching-shape body 48a receives a gas pressure to bring into intimate contact with the airbag base cloth, thereby closing respective openings mutually and complimentarily, so that gas leakage can be shut off.

Figure 21:
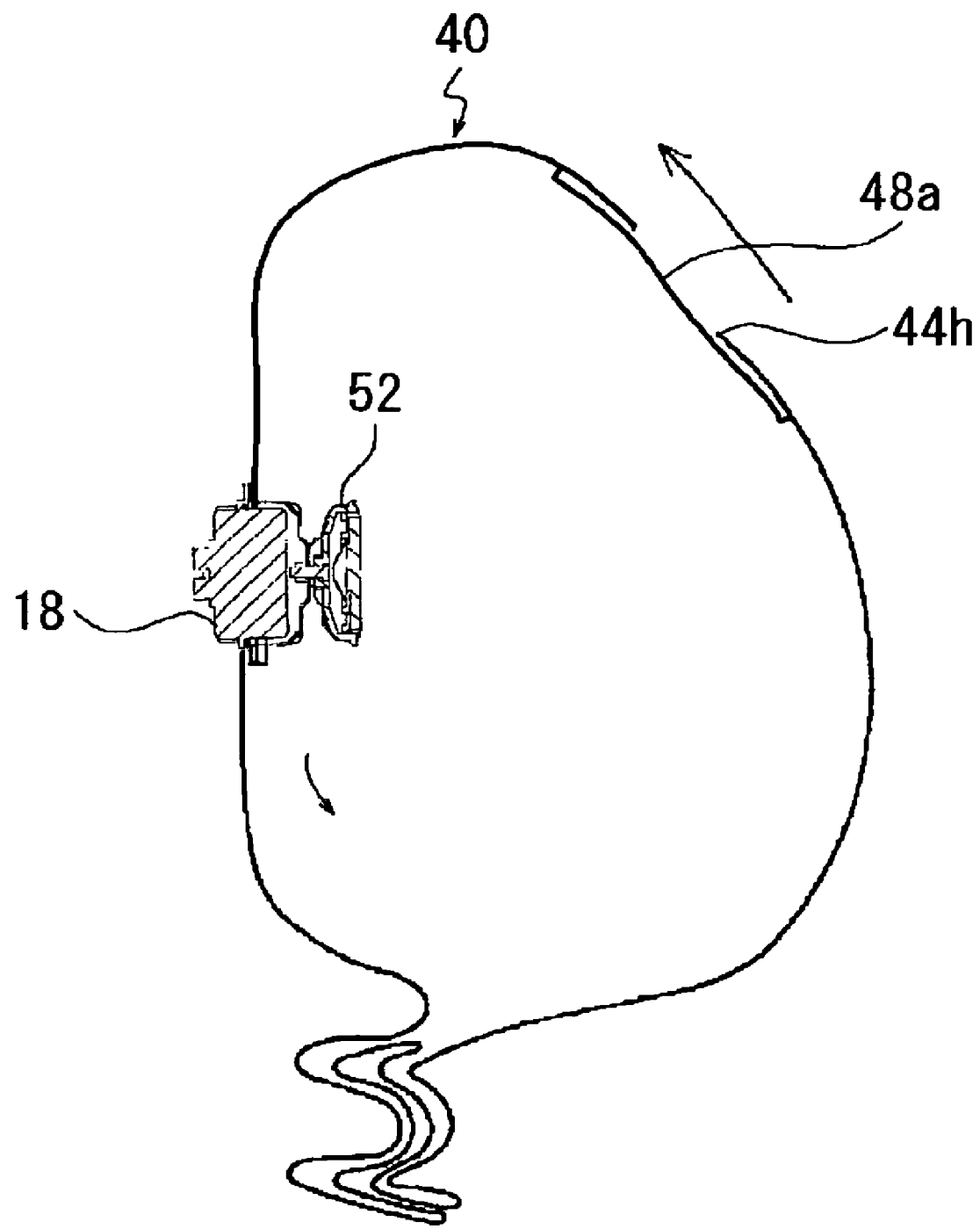
FIG. 21 is a sectional view showing a state of early stage of expansion of the airbag of the fifth embodiment.

In the early stage where the airbag 40 starts the expansion after the airbag cover 50 is split, the airbag 40 is slightly expanded about the periphery of the inflator 18 as shown in FIG. 21.

When gas is further introduced into the airbag 40, the concave part 52 comes out from the through hole 44h and hole 40ah so that the airbag 40 is expanded.

Figure 22:
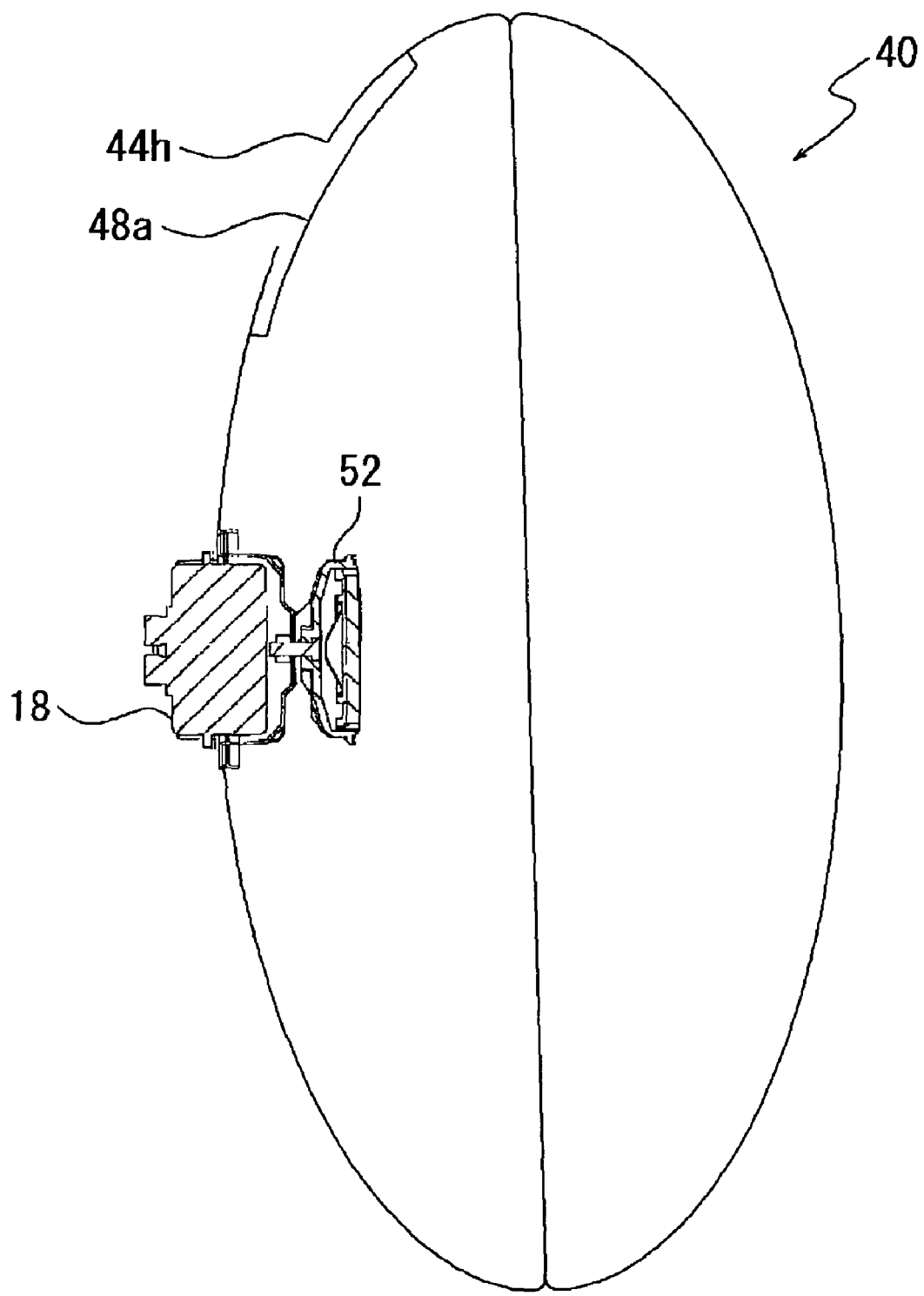
FIG. 22 is a sectional view showing a state where expansion of the airbag of the fifth embodiment is completed.

After the airbag is expanded to some extent, the airbag 40 continues expansion at a part unevenly distributed under the concave part 52, namely, mainly at a front side portion and lower portion of the airbag 40, and it is expanded and spread in a flat sphere which is a natural expansion shape of the airbag 40 as shown in FIG. 22 in the manner that the part where the through hole 44h of the airbag 40 is formed is pushed away from above to the backside.

According to the airbag device having the structure set forth above, the center member 30 can be attached not to jump out at the time of spread of the airbag 40 so that the airbag 40 is expandable and spreadable without causing the center member 30 to be jumped out at the time of spread of the airbag 40.

Further, according to the present embodiment, since the central concave part 52 of the airbag cover 50 is attached and fixed to the base plate 16 for attaching the inflator thereto via the connection member 28 or 28', and the connection member 28 or 28' can be attached to the base plate 16 together with the airbag 40 at the time of connection between the base plate 16 and the cushion plate 22 or 22', so that a fixing means of the concave part 52 can be simplified and parts for use in attachment can be subjected to sharing, causing the structure to be simplified. Further, with such a simplified structure, gas leakage can be prevented at the time of expansion of the airbag.

Modifications of the airbag according to the present embodiment are now explained.

Figure 23A:
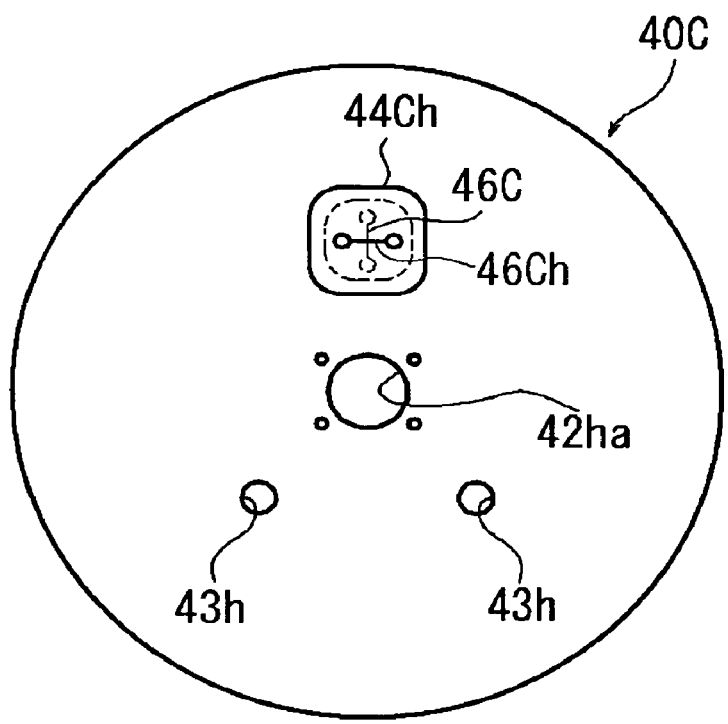
FIG. 23A is a rear view of an airbag according to a first modification of the fifth embodiment.
Figure 23C:
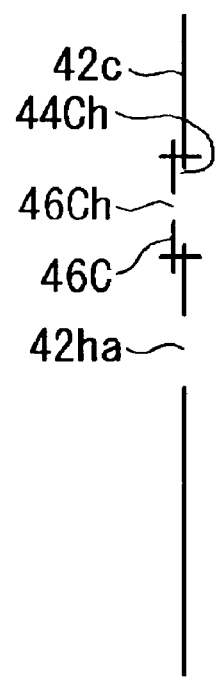
FIG. 23B and FIG. 23C are sectional views showing a main part of the same airbag.
Figure 23B:
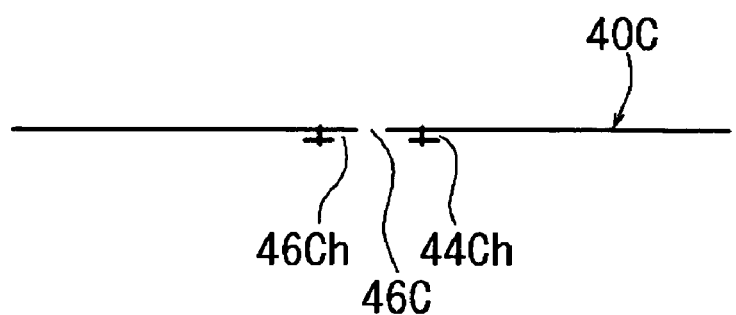

FIG. 23A is a plan view showing an airbag according to the first modification, and FIG. 23B and FIG. 23C are sectional views showing a main part of the airbag, respectively.

According to an airbag 40C, a through hole part 44Ch like the through hole part 44Bh is formed. The through hole part 44Ch is not always in a shape of linear cut part but may be in a round hole shape. Further, a plurality (two in this modification) of vent holes 43h are formed on the outer periphery of airbag attachment holes 42ha.

More further, a patching-shape body 46C is attached to an outer face side of the airbag 40C and at an area for covering the through hole part 44Ch, and a second through hole part 46Ch is formed on the patching-shape body 46C at a position different from the through hole part 44Ch.

To be concrete, the patching-shape body 46C is formed substantially in a square cloth shape having rounded at apexes, and the peripheral edge part thereof is disposed to surround the through hole part 44Ch and is sawn to the airbag 40C. Meanwhile, the patching-shape body 46C may be sawn to the inner face side of the airbag 40C. Still further, the second through hole part 46Ch is formed by forming a linear cut part on the patching-shape body 46C. The second through hole part 46Ch is formed at a position substantially crossing perpendicularly with the through hole part 44Ch.

It is not always necessary that the through hole part 44Ch and the second through hole part 46Ch intersect perpendicularly with each other but may intersect obliquely with each other, or it is not necessary that they intersect with each other as shown in the next modification. In short, it is sufficient that both the through hole part 44Ch and the second through hole part 46Ch have a positional relation where the through hole part 44Ch and the second through hole part 46Ch are displaced with each other in position at the time of spread of the airbag 40C.

After the concave part 52 comes out from the through hole part 44Ch and the second through hole part 46Ch at the time of expansion and spread of the airbag 40C, the through hole part 44Ch and the second through hole part 46Ch are returned to a linear state to close the openings thereof. Further, in this state, since the peripheral edge part of the through hole part 44Ch and that of the second through hole 46Ch close the respective openings mutually and complimentarily, thereby more reliably preventing leakage of gas passing the airbag 44Ch.

After the complete expansion of the airbag 40C, gas is mainly discharged through the vent hole 43$h$.

Accordingly, the amount of gas flowing out through the through hole part 44Ch can be restricted in the airbag 40C.

Figure 24A:
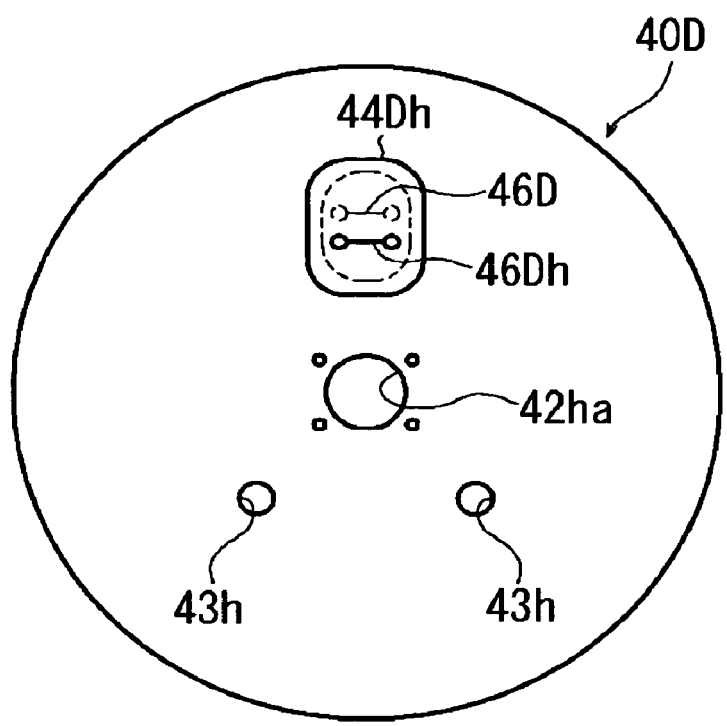
FIG. 24A is a rear view of an airbag according to a second modification.
Figure 24B:
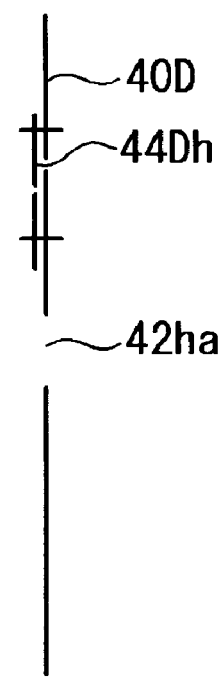
FIG. 24B is a sectional view showing a main part of the same airbag.
Figure 25:
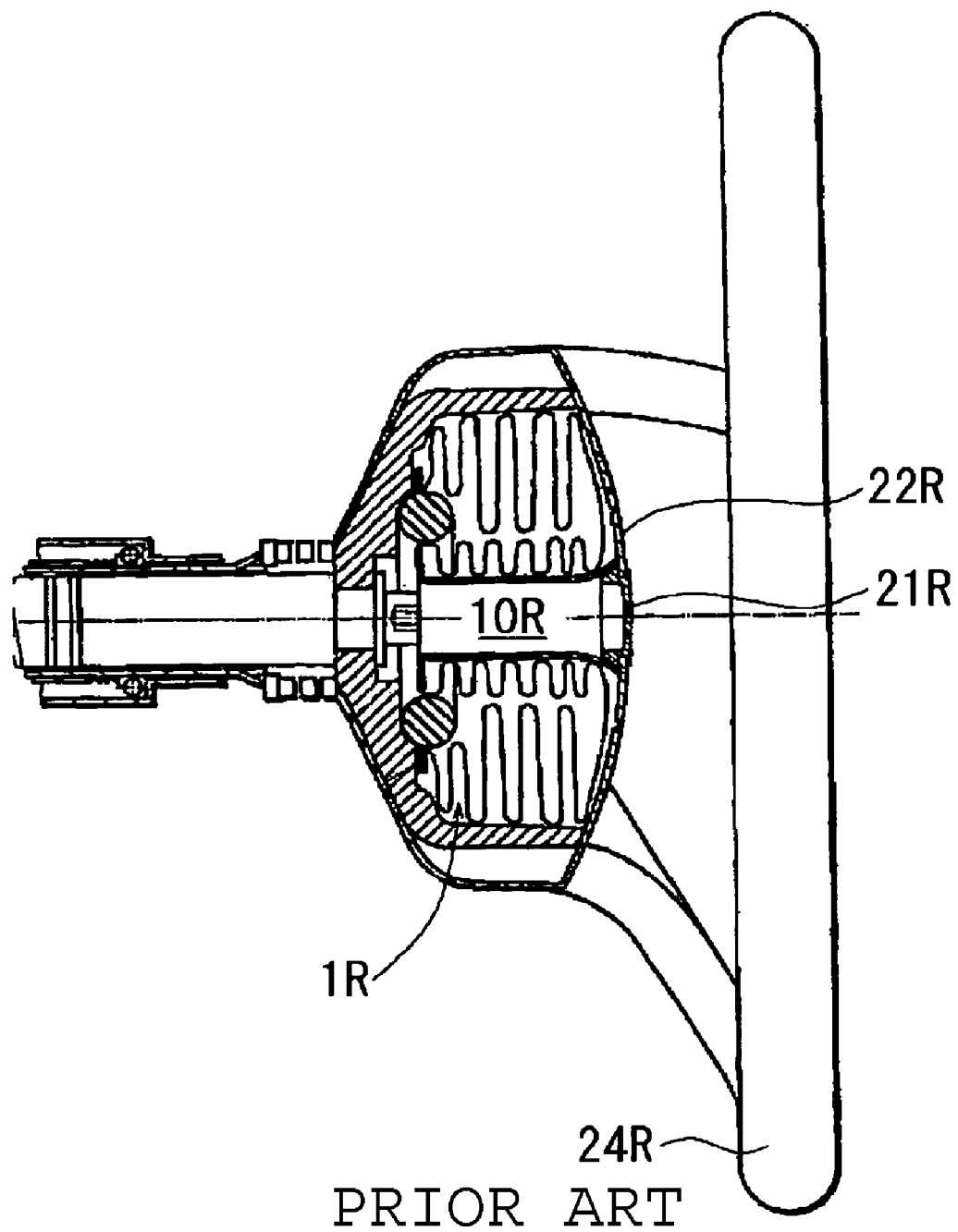
FIG. 25 is a sectional view showing a conventional airbag device.

FIG. 24A is a rear view showing an airbag according to the second modification, and FIG. 25B is a sectional view showing the main part of the same airbag.

The second modification shows an example of an airbag 40D disposed at a position where a second through hole part 46Ch does not intersect with a through hole part 44Ch, namely, a linear-shaped second through hole part 46Dh is formed at a position to be substantially in parallel with the through hole part 44Dh of a patching-shape body 46D, and apart from the through hole part 44Dh with a predetermined distance. Other configurations are the same as those of the airbag 40C of the first embodiment.

After the concave part 52 comes out from the through hole part 44Dh and the second through hole part 46Dh at the time of expansion and spread of the airbag 40D, the through hole part 44Dh and the second through hole part 46Dh are returned to a linear state to close the openings thereof. In this state, since the peripheral edge cloth part of the through hole part 44Dh and that of the second through hole 46Dh close the respective openings mutually and complimentarily, thereby more reliably preventing leakage of gas passing the airbag 44D. In addition to that, since the through hole part 44Dh and the second through hole part 46Dh are not disposed at a position where they overlap each other, leakage of gas passing the through hole part 44Ch can be more reliably prevented even compared with the first modification.

Accordingly, in the airbag 40D, the amount of gas flowing out through the through hole part 44Dh can be restricted.

In both the first and second modifications, the amount of gas flowing out from the through hole parts 44Dh and 44Ch can be restricted after the concave part 52 comes out from the through hole parts 44Dh and 44Ch. Accordingly, timing of gas leakage, the amount of leakage of gas, and so forth are adjusted by setting, for example, vent holes 43$h$ provided separately (setting sizes, shapes, positions of the holes), so that characteristics of the airbag (shock absorbance characteristics and so forth) can be adjusted with ease. Further, if the amount of gas flowing out can be appropriately adjusted, the separately provided vent holes can be dispensed with.

Considering from another point of view, even if the openings of the through hole parts 44Dh and 44Ch and so forth are set to be larger, leakage of excessive gas can be prevented so that the catching of the airbag by the concave part 52 can be restrained at the minimum at the time of expansion and spread of the airbag.

According to the airbag device of the present invention having the structure set forth above, the center member 30 can be attached not to be jumped out at the time of spread of the airbag 40, so that the airbag 40 is expandable and spreadable while the center member 30 is not jumped out at the time of spread of the airbag 40.

Further, since the central concave part 52 of the airbag cover 50 is attached and fixed to the base plate 16 for attaching the inflator thereto via the connection member 28 or 28', and the connection member 28 or, 28' can be attached to the base plate 16 together with the airbag 40 at the time of connection between the base plate 16 and the cushion plate 22 or 22', so that the fixing means of the concave part 52 can be simplified and parts for use in attachment can be subjected to sharing, causing the structure to be simplified.

What is claimed is:

1. An airbag device comprising:
an inflator for generating gas;
an airbag being expandable by gas generated in the inflator;
an airbag cover for folding the airbag to house the folded airbag therein and openable at the time of expansion of the airbag, wherein said airbag cover includes a plurality of cover pieces;
a base plate which is discoid shaped and having a hole formed at a central portion thereof in which the inflator is fitted;
a connection member having an elongated shape comprising a central part, leg parts extending from the central part, and attachment feet formed at distal ends of the leg parts, respectively; and
a cushion plate for clamping and holding the airbag between the cushion plate and the base plate,
wherein the cushion plate has concave parts on its front face for housing each of the attachment feet of the connection member, and a central portion of the airbag cover being opened by tear lines at the time of expansion of the airbag is connected to the central part of the connection member, while the attachment feet of the connection member are clamped and held between the base plate and the concave parts of the cushion plate together with the airbag, and the connection member holds the central portion of the airbag cover at the time of spread of the airbag when the airbag is expanded forward by gas from the inflator while getting across the central portion of the airbag cover,
wherein the tear lines delineate the central portion from the cover pieces, so that when the tear lines tear, the cover pieces are completely detached from the central portion so as to move outwardly away from the central portion.

2. An airbag device according to claim 1, wherein the connection member has holes or recesses, and the concave parts of the cushion plate have protrusions capable of engaging with the holes or the recesses.

3. An airbag device according to claim 1, wherein the connection member is fastened and fixed to the concave parts of the cushion plate together by a bolt for fixing the inflator.

4. An airbag device according to claim 1, wherein the connection member is made of a metal member.

* * * * *